(12) United States Patent
Ogata et al.

(10) Patent No.: US 10,227,935 B2
(45) Date of Patent: Mar. 12, 2019

(54) ENGINE CONTROL SYSTEM

(71) Applicant: Hitachi Automotive Systems, Ltd., Hitachinaka-shi, Ibaraki (JP)

(72) Inventors: Kenichiroh Ogata, Tokyo (JP); Takashi Okamoto, Hitachinaka (JP); Yoshinobu Arihara, Hitachinaka (JP)

(73) Assignee: Hitachi Autmotive Systems, Ltd., Hitachinaka-shi (JP)

( * ) Notice: Subject to any disclaimer, the term of this patent is extended or adjusted under 35 U.S.C. 154(b) by 19 days.

(21) Appl. No.: 15/125,371

(22) PCT Filed: Jan. 7, 2015

(86) PCT No.: PCT/JP2015/050196
§ 371 (c)(1),
(2) Date: Sep. 12, 2016

(87) PCT Pub. No.: WO2015/146209
PCT Pub. Date: Oct. 1, 2015

(65) Prior Publication Data
US 2017/0074178 A1 Mar. 16, 2017

(30) Foreign Application Priority Data
Mar. 25, 2014 (JP) .................................. 2014-061014

(51) Int. Cl.
*F02D 37/02* (2006.01)
*F02D 21/08* (2006.01)
(Continued)

(52) U.S. Cl.
CPC ................ *F02D 37/02* (2013.01); *F01P 3/20* (2013.01); *F01P 5/10* (2013.01); *F02B 31/06* (2013.01);
(Continued)

(58) Field of Classification Search
CPC .. F02D 37/02; F02D 41/0047; F02D 41/3836; F02D 41/401; F02D 13/0261;
(Continued)

(56) References Cited

U.S. PATENT DOCUMENTS 5,908,022 A * 6/1999 Aoki .................... F02D 41/0072
123/456
6,606,979 B2 * 8/2003 Kimura ...................... F01L 9/02
123/305

(Continued)

FOREIGN PATENT DOCUMENTS

DE 694 25 177 T2 3/2001
EP 2 395 220 A1 12/2011
(Continued)

OTHER PUBLICATIONS

Extended European Search Report issued in counterpart European Application No. 15768516.5 dated Nov. 13, 2017 (seven pages).
(Continued)

*Primary Examiner* — Joseph Dallo
(74) *Attorney, Agent, or Firm* — Crowell & Moring LLP

(57) ABSTRACT

The purpose of the present invention is to provide an engine control system that is capable of promoting mixing of fuel and air during exhaust gas recirculation, thereby suppressing combustion fluctuation of a gasoline engine, such that efficiency and exhaust gas purification can be simultaneously achieved. The engine control system controls an engine and is equipped with an injection device for injecting fuel directly into a cylinder and a recirculation device for recirculating exhaust gas to the intake side. When the temperature of the recirculating exhaust gas recirculated by the recirculation device is high as opposed to when the temperature is low, or when the amount of the recirculating exhaust gas recirculated by the recirculation device is large as opposed to when the amount is small, at least one of the
(Continued)

following is executed: advancing of the fuel injection timing (IT_SP (n−2)) of the injection device; increasing of the fuel pressure (FP) to be supplied to the injection device; reducing the frequency (n) of divided multi-stage injection to be performed by the injection device during the period between intake top dead center and compression top dead center; and reducing of the interval of divided multi-stage injection (IT_RE (n−2)).

8 Claims, 24 Drawing Sheets

(51) Int. Cl.
| | |
|---|---|
| F02D 41/34 | (2006.01) |
| F02D 41/40 | (2006.01) |
| F02P 5/15 | (2006.01) |
| F02P 15/08 | (2006.01) |
| F02D 41/00 | (2006.01) |
| F02B 31/06 | (2006.01) |
| F02D 13/02 | (2006.01) |
| F02M 26/15 | (2016.01) |
| F02M 26/28 | (2016.01) |
| F01P 3/20 | (2006.01) |
| F01P 5/10 | (2006.01) |
| F02D 41/38 | (2006.01) |
| F02P 5/145 | (2006.01) |
| F02D 41/14 | (2006.01) |

(52) U.S. Cl.
CPC ..... *F02D 13/0219* (2013.01); *F02D 13/0261* (2013.01); *F02D 21/08* (2013.01); *F02D 41/005* (2013.01); *F02D 41/0047* (2013.01); *F02D 41/345* (2013.01); *F02D 41/3836* (2013.01); *F02D 41/401* (2013.01); *F02D 41/402* (2013.01); *F02M 26/15* (2016.02); *F02M 26/28* (2016.02); *F02P 5/145* (2013.01); *F02P 5/1516* (2013.01); *F02P 15/08* (2013.01); *F02D 2041/0015* (2013.01); *F02D 2041/1472* (2013.01); *F02D 2200/0602* (2013.01); *F02D 2200/0606* (2013.01); *Y02T 10/146* (2013.01); *Y02T 10/18* (2013.01); *Y02T 10/44* (2013.01); *Y02T 10/46* (2013.01); *Y02T 10/47* (2013.01)

(58) Field of Classification Search
CPC .... F02D 13/0219; F02D 41/402; F02D 41/34; F02P 5/145; F02P 5/1516; F01P 5/10; F01P 3/20; F02M 26/28; F02M 26/15; F02B 31/06

See application file for complete search history.

(56) References Cited

U.S. PATENT DOCUMENTS

| | | | |
|---|---|---|---|
| 7,128,048 B2 * | 10/2006 | Yamoaka | F02B 1/12 123/305 |
| 2002/0134346 A1 * | 9/2002 | Yamauchi | F02B 23/104 123/295 |
| 2003/0056752 A1 * | 3/2003 | Sukegawa | F02B 1/12 123/305 |
| 2005/0039439 A1 * | 2/2005 | Kitahara | F02D 41/0057 60/274 |
| 2011/0307164 A1 * | 12/2011 | Arihara | F02D 35/026 701/105 |
| 2012/0097126 A1 * | 4/2012 | Kumano | F02D 13/0219 123/294 |
| 2013/0087639 A1 | 4/2013 | Nakai et al. | |
| 2013/0110377 A1 * | 5/2013 | Sukegawa | F02D 41/0062 701/103 |
| 2013/0259778 A1 * | 10/2013 | Doering | B01D 53/9409 423/212 |
| 2014/0060489 A1 * | 3/2014 | Iwai | F02B 23/101 123/478 |
| 2015/0192087 A1 * | 7/2015 | Shirahashi | F02D 41/405 701/104 |
| 2015/0240706 A1 * | 8/2015 | Yamagata | F02D 21/08 60/603 |
| 2016/0305356 A1 * | 10/2016 | Iwata | F02D 41/403 |

FOREIGN PATENT DOCUMENTS

| | | |
|---|---|---|
| JP | 2611217 B2 | 5/1997 |
| JP | 2001-280123 A | 10/2001 |
| JP | 2003-106187 A | 4/2003 |
| JP | 2006-316709 A | 11/2006 |
| JP | 2009-144535 A | 7/2009 |
| JP | 2011-214536 A | 10/2011 |
| JP | 2013-194664 A | 9/2013 |
| WO | WO 2011/117968 A1 | 9/2011 |

OTHER PUBLICATIONS

International Search Report (PCT/ISA/210) issued in PCT Application No. PCT/JP2015/050196 dated Feb. 17, 2015 with English-language translation (five (5) pages).
Japanese-language Written Opinion (PCT/ISA/237) issued in PCT Application No. PCT/JP2015/050196 dated Feb. 17, 2015 (five (5) pages).

* cited by examiner

ENGINE CONTROL SYSTEM

TECHNICAL FIELD

The present invention relates to a control system of an engine mounted in a vehicle or the like, and particularly relates to a control system suitable to control an internal combustion engine which combusts fuel in a combustion chamber and removes power.

BACKGROUND ART

The current automobile is strongly required to improve efficiency and purify exhaust gas from the viewpoint of environment conservation and effective use of resources. The development of a gasoline engine including a cylinder direct injection fuel supply device and an exhaust gas recirculation device is under way as means for improving efficiency. The cylinder direct injection fuel supply device uses a fuel injection valve (hereinafter referred to as the injector) to inject fuel directly into a combustion chamber. The inside of the combustion chamber is cooled to obtain the effect of suppressing abnormal combustion. The exhaust gas recirculation device recirculates exhaust gas emitted from the gasoline engine into an intake pipe, and flows it back into the combustion chamber for combustion. The specific heat of gas in the combustion chamber is increased to reduce the temperature of the gas. Accordingly, the suppression of abnormal combustion can be obtained. The abnormal combustion suppression effect enables the achievement of a high compression ratio or downsizing of the gasoline engine. Accordingly, the effect of improvement in efficiency can be obtained. The gasoline engine including the cylinder direct injection fuel supply device and the exhaust gas recirculation device has a problem that combustion executed in the combustion chamber fluctuates, varies, or the like (hereinafter referred to as the combustion fluctuation) due to changes in exhaust gas recirculation amount and exhaust gas recirculating gas temperature by the exhaust gas recirculation device.

Hence, for example, Publication of U.S. Pat. No. 2,611,217 (PTL 1) discloses a fuel injection timing control system including fuel injection control means for determining a fuel injection timing in accordance with the operating state of an internal combustion engine, and injecting fuel independently into each cylinder of the internal combustion engine based on the fuel injection timing, and an exhaust gas recirculation device for recirculating exhaust gas from an exhaust system to an intake system is provided with injection timing change means for retarding the fuel injection timing upon execution of the recirculation of the exhaust gas and advancing the fuel injection timing upon the stop of the recirculation of the exhaust gas (refer to the claims).

CITATION LIST

Patent Literature

PTL 1: Publication of U.S. Pat. No. 2,611,217

SUMMARY OF INVENTION

Technical Problem

In the fuel injection timing control system of PTL1, the fuel is injected to the vicinity of a plug to retard the injection timing upon the exhaust gas recirculation. In this case, there arises a problem that the mixing of fuel and air is reduced. Furthermore, the pressure in the combustion chamber is in the middle of compression and is increased as compared to the intake stroke. Therefore, air resistance and the difference pressure between the pressure of the fuel (hereinafter fuel pressure) and the pressure in the combustion chamber are reduced, and accordingly the fuel injected from the injector is reduced in spray penetration, and a spray distance (hereinafter referred to as the penetration) is shortened. As a result, it becomes hard for the fuel to reach the vicinity of the plug since the injection timing was retarded. The penetration is also shortened even if any of the gas temperature in the combustion chamber, the intake air temperature, and the exhaust gas recirculating gas temperature is increased. This is because the fuel is injected into the gas at a higher temperature to promote atomization and vaporization, and accordingly the spray penetration is reduced. In this manner, the injection timing is retarded to make it hard for the fuel to reach the vicinity of the plug. Accordingly, ignition may become hard, and the combustion fluctuation may become worse. Consequently, there are problems that the efficiency of the internal combustion engine decreases and exhaust becomes worse.

The present invention has been made considering the above problems, and provides an engine control system that can promote the mixing of fuel and air upon exhaust gas recirculation, and as a result, can suppress the combustion fluctuation of a gasoline engine and achieve compatibility between efficiency and exhaust gas purification.

Solution to Problem

In order to achieve the above object, the present invention provides an engine control system for controlling an engine, including an injection device which injects fuel directly into a cylinder, and a recirculation device which recirculates exhaust gas to an intake side, wherein when the temperature of the recirculating exhaust gas to be recirculated by the recirculation device is high as opposed to when the temperature is low, or when the amount of the recirculating exhaust gas to be recirculated by the recirculation device is large as opposed to when the amount is small, the engine control system executes at least one of advancing a fuel injection timing of the injection device, increasing the pressure of fuel to be supplied to the injection device, reducing the frequency of divided multi-stage injection of the injection device during a period from intake top dead center and compression top dead center, and reducing the interval of the divided multi-stage injection.

Advantageous Effects of Invention

The penetration can be extended by advancing an injection timing, increasing fuel pressure, reducing the frequency of divided multi-stage injection from intake top dead center to compression top dead center, or reducing the injection interval of the divided multi-stage injection, in accordance with the increase of an exhaust gas recirculation amount and the increase of an exhaust gas recirculating gas temperature. Consequently, fuel can be widely distributed in a combustion chamber, and the mixing of fuel and air is promoted. As a result, it is possible to suppress the combustion fluctuation of a gasoline engine and achieve compatibility between efficiency and exhaust gas purification.

Problems, configurations, and effects other than those described above will be clear from the description of the following embodiments.

DESCRIPTION OF EMBODIMENTS

Embodiments according to the present invention are described hereinafter.

First Embodiment

The configuration and operation of an engine control system according to the embodiment are described below, using FIGS. 1 to 13.

FIGS. 1 to 13 are configuration diagrams of a system in which a control system of a gasoline engine including an injection device which injects fuel directly into a cylinder and a recirculation device which recirculates exhaust gas to an intake side, according to one embodiment of the present invention, is applied to an automobile gasoline engine. When the temperature of the exhaust gas to be recirculated by the recirculation device is high as opposed to when the temperature is low, or when the amount of the exhaust gas to be recirculated by the recirculation device is large as opposed to when the amount is small, the engine control system executes at least one of advancing a fuel injection timing of the injection device, increasing the pressure of fuel supplied to the injection device, reducing the frequency of divided multi-stage injection by the injection device during a period from intake top dead center to compression top dead center, and reducing the injection interval of the divided multi-stage injection.

Figure 1:
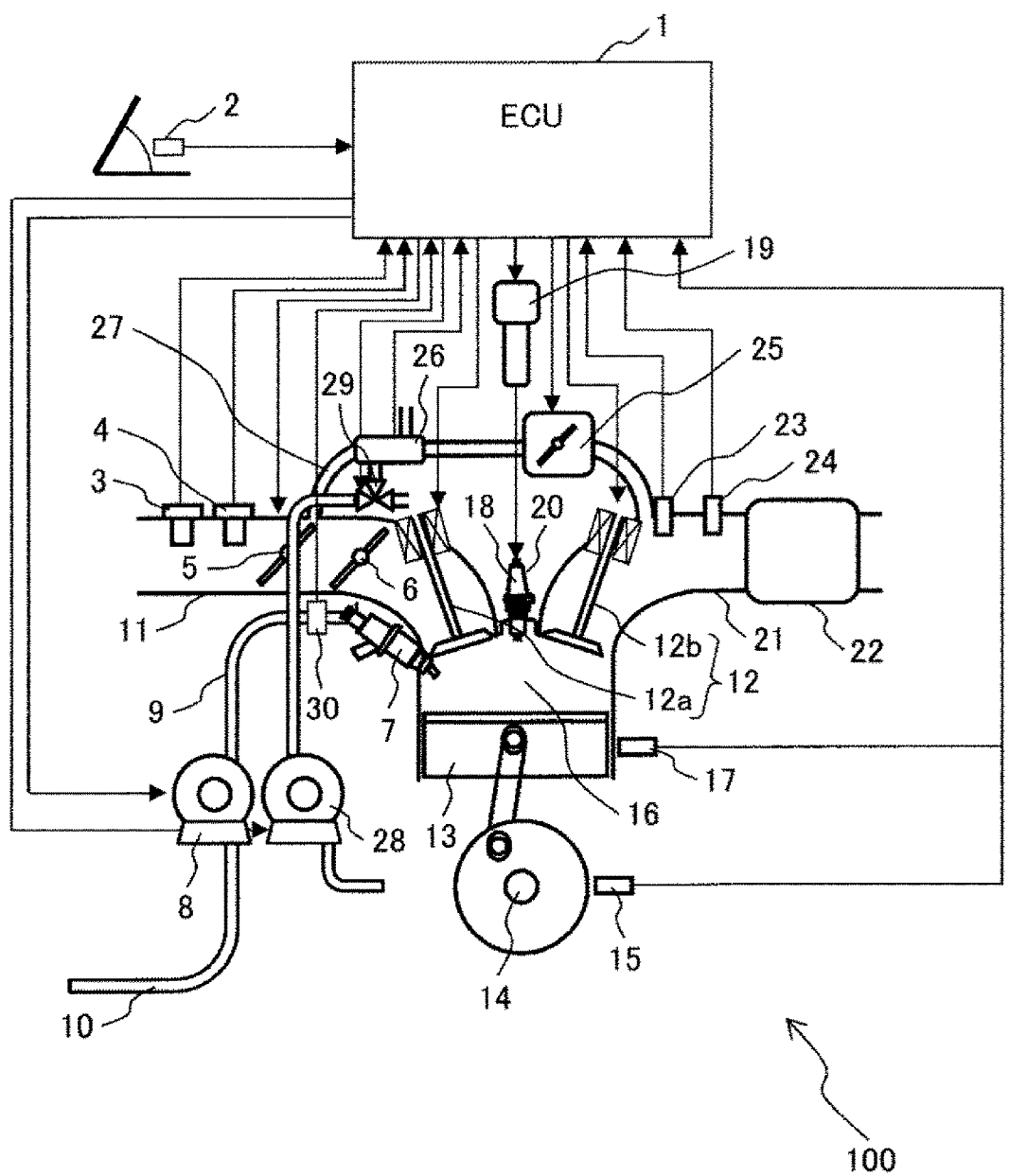
FIG. 1 is a system configuration diagram of an automobile engine system according to embodiments of the present invention.

FIG. 1 is a system configuration diagram of an automobile engine system according to the embodiment. An engine 100 is an automobile engine which carries out spark ignition combustion. An intake pipe 11 includes, at appropriate positions, an air flow sensor 3 which measures the amount of intake air, a throttle 5 which adjusts the pressure of the intake pipe, an intake air temperature and moisture sensor 4 which measures the temperature and moisture of the intake air, the intake air temperature and moisture sensor 4 being an aspect of an intake air temperature and moisture detector, and a tumble valve 6 which makes the inner area of the intake pipe variable. The air flow sensor 3 may be an intake air pressure sensor.

Moreover, the engine 100 includes, at appropriate positions, a fuel injection device (hereinafter referred to as the injector) 7 which injects the fuel into a combustion chamber 16, an ignition plug 18 which supplies ignition energy, and a variable valve 12 (an intake valve 12a, an exhaust valve 12b) which adjusts intake air flowing into the combustion chamber 11 and exhaust gas to be emitted. The engine 100 includes, at appropriate positions, a common rail 9 coupled to the injector 7 to supply the fuel, a fuel pump 8 for pumping the fuel to the common rail 9, and a fuel pipe 10 which supplies the fuel to the fuel pump 8.

Moreover, the common rail 9 includes a fuel pressure sensor 30 which measures the pressure of the fuel, the fuel pressure sensor 30 being an aspect of a fuel pressure detector, at an appropriate position. The fuel pressure sensor 30 may be a fuel temperature sensor. The ignition plug 18 is connected to the ignition coil 19 and controlled by the ignition coil 19 over the ignition energy.

Furthermore, an exhaust pipe 21 includes, at appropriate positions, a three-way catalytic converter 22 which purifies the exhaust gas, an exhaust gas temperature sensor 23 which measures the temperature of the exhaust gas upstream of the three-way catalytic converter 22, the exhaust gas temperature sensor 23 being an aspect of an exhaust gas temperature detector, an air-fuel ratio sensor 24 which detects the air-fuel ratio of the exhaust gas upstream of the three-way catalytic converter 22, the air-fuel ratio sensor 24 being an aspect of an air-fuel ratio detector, and an exhaust gas recirculation pipe 27 coupled to the intake pipe 11. The air-fuel ratio sensor 24 may be an oxygen concentration sensor.

Moreover, the exhaust gas recirculation pipe 27 includes, at appropriate positions, an EGR valve 25 which adjusts an exhaust gas recirculation amount, and an EGR cooler 26 which adjusts the temperature of recirculating gas, the EGR cooler 26 being an aspect of a recirculating gas temperature detector which detects the temperature of the recirculating gas. The EGR valve 25 can include, for example, a butterfly valve or needle valve. Moreover, the EGR cooler 26 has an inlet and outlet of cooling water for making temperature adjustments to the temperature of the recirculating gas. The engine 100 includes a cooling water pump 28 and a cooling water channel switching valve 29 for controlling the flow rate of the cooling water, at their appropriate positions. Cooling water or coolant for cooling the engine is used as the cooling water or coolant used by the EGR cooler 26.

Moreover, a crankshaft 14 includes a crank angle sensor 15 for detecting the angle and rotation speed of the crankshaft 14 and the travel speed of a piston 13. Moreover, the engine 100 includes an ion sensor 20 which detects the amount of ions in the engine, at an appropriate position.

Moreover, the ion sensor 20 may be a pressure sensor which detects pressure in the engine (combustion chamber).

Moreover, the engine 100 includes a cooling water temperature sensor 17 which detects the temperature of the cooling water in the engine 100, at an appropriate position. Signals obtained from the air flow sensor 3, the intake air temperature and moisture sensor 4, the crank angle sensor 15, the cooling water temperature sensor 17, the ion sensor 20, the exhaust gas temperature sensor 23, the air-fuel ratio sensor 24, the EGR cooler 26, and the fuel pressure sensor 30 are transmitted to an engine control unit (hereinafter the ECU 1).

A signal obtained from an accelerator opening sensor 2, in addition to the above signals, is transmitted to the ECU 1. The accelerator opening sensor 2 detects the depressed amount of an accelerator pedal, that is, an accelerator opening. The ECU 1 computes required torque based on an output signal of the accelerator opening sensor 2. In other words, the accelerator opening sensor 2 is used as a required torque detection sensor which detects required torque for the engine 100.

The ECU 1 computes the angle and rotation speed of the crankshaft 14 and the travel speed of the piston 13 based on an output signal of the crank angle sensor 15. The ECU 1 suitably computes signals (commands) which determine main operating amounts of the engine 100 such as the degree of opening of the throttle 5, the degree of opening of the tumble valve 6, an injection signal of the injector 7, a drive signal of the fuel pump 8, a valve opening/closing timing of the variable valve 12, an ignition signal of the ignition coil 19, the degree of opening of the EGR valve 28, and drive signals of the cooling water pump 28 and a cooling water switching valve as cooling water control, based on the operating state of the engine 100 obtained from the outputs of the various sensors.

The throttle opening computed by the ECU 1 is transmitted to the throttle 5 as a throttle drive signal. The tumble valve opening computed by the ECU 1 is transmitted to the tumble valve 6 as a tumble valve drive signal. The injection signal computed by the ECU 1 is converted into an injector valve opening pulse signal and transmitted to the injector 7. The fuel pump drive signal computed by the ECU 1 is transmitted to the fuel pump 8. The valve opening/closing timing computed by the ECU 1 is transmitted as a variable valve drive signal to the variable valve 12. The ignition signal computed by the ECU 1 is transmitted to the ignition coil 19 in such a manner as to ignite with the ignition signal. The EGR valve opening computed by the ECU 1 is transmitted as the EGR valve drive signal to the EGR valve 25. The cooling water control signal computed by the ECU 1 is transmitted as a cooling water control drive signal to the cooling water pump 28 and the cooling water channel switching valve 29.

The fuel is injected into the mixture of air flowing from the intake pipe 11 into the combustion chamber 16 via the intake valve 12a of the variable valve 12 and recirculating gas which recirculates from the exhaust pipe 21 via the EGR valve 25 and the EGR cooler 26 to form a combustible mixture. The combustible mixture is exploded at a predetermined ignition timing by a spark generated by the ignition plug 18 to which ignition energy has been supplied by the ignition coil 19. The combustion pressure presses down the piston 13 to become the drive force of the engine 100. The exhaust gas after the explosion is transmitted to the three-way catalytic converter 22 via the exhaust pipe 21. The exhaust gas constituents are purified in the three-way catalytic converter 22, and then emitted. The engine 100 is mounted in an automobile. Information on the travel state of the automobile is transmitted to the ECU 1.

Figure 2:
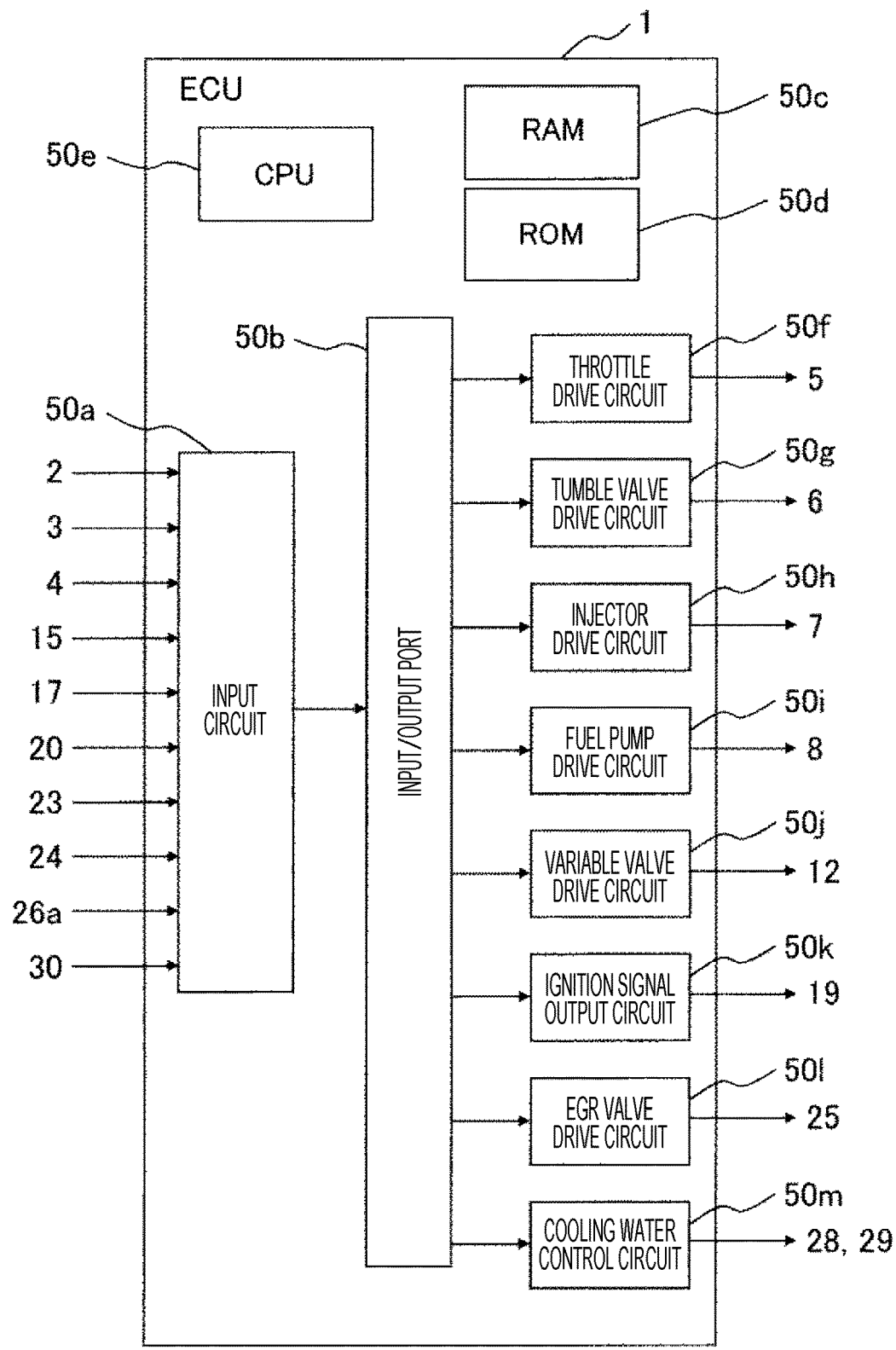
FIG. 2 is a system block diagram illustrating the configuration of an ECU 1 according to a first embodiment of the present invention.

FIG. 2 is a system block diagram illustrating the configuration of the ECU 1 according to the embodiment. Output signals of the accelerator opening sensor 2, the air flow sensor 3, the intake air temperature and moisture sensor 4, the crank angle sensor 15, the cooling water temperature sensor 17, the ion sensor 20, the exhaust gas temperature sensor 23, the air-fuel ratio sensor 24, and a recirculating gas temperature detector 26a provided to the EGR cooler 26, and the fuel pressure sensor 30 are input into an input circuit 50a of the ECU 1. However, input signals are not limited to them. The input signals of the sensors, which have been input, are transmitted to the input/output port 50b. The values transmitted to the input/output port 50b are stored in a RAM 50c. A computation process is performed on them in a CPU 50e. A control program in which the content of the computation process is described is previously written in a ROM 50d. After being stored in the RAM 50c, a value indicating the operating amount of each actuator computed in accordance with the control program is transmitted to an output port of the input/output port 50b, and then to the actuator via its drive circuit. In a case of the embodiment, the drive circuits include a throttle drive circuit 50f, a tumble valve drive circuit 50g, an injector drive circuit 50h, a fuel pump drive circuit 50i, a variable valve drive circuit 50j, an ignition signal output circuit 50k, an EGR valve drive circuit 50l, and a cooling water control drive circuit 50m. The drive circuits control the throttle 5, the tumble valve 6, the injector 7, the fuel pump 8, the variable valve 12, the ignition coil 19, the EGR valve 25, and the cooling water pump or cooling water channel switching valve 29, respectively. In the embodiment, the drive circuits are included in the ECU 1. However, the embodiment is not limited to this. Any of the drive circuits may be included in the ECU 1 and the other drive circuits may be provided outside the ECU 1.

Figure 3A:
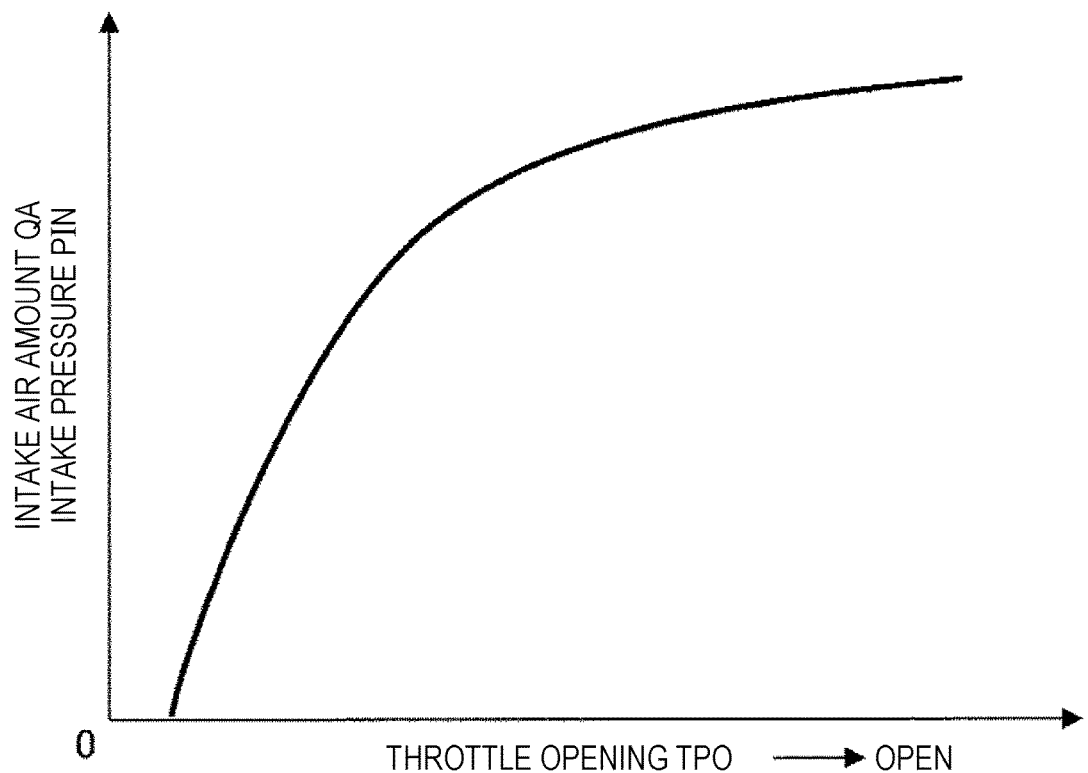
FIG. 3A is a characteristic diagram of a throttle according to the first embodiment of the present invention.
Figure 3B:
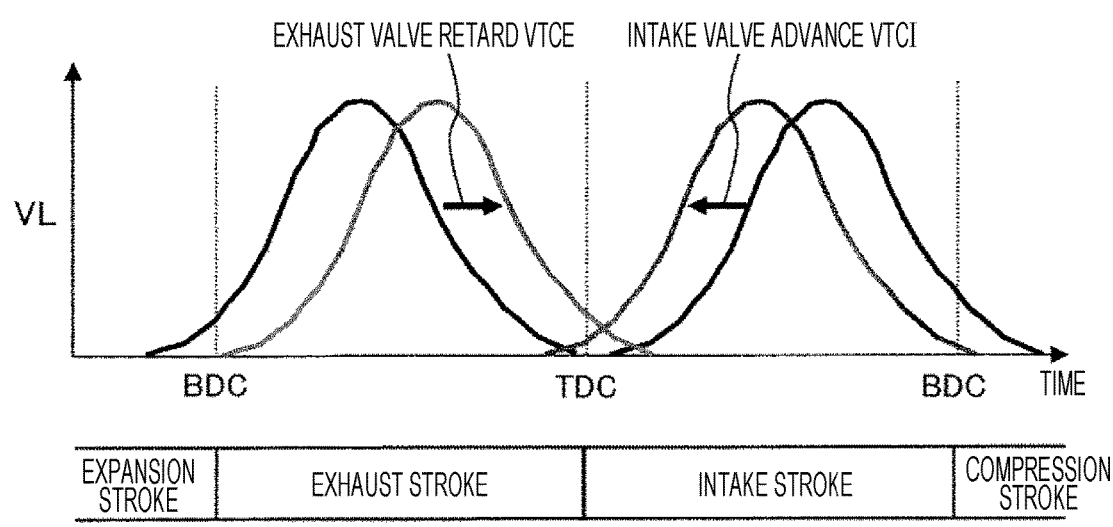
FIG. 3B is a characteristic diagram of a variable valve according to the first embodiment of the present invention.

FIG. 3A is a characteristic diagram illustrating the characteristic of the throttle according to the embodiment. FIG. 3B is a characteristic diagram illustrating the characteristic of the variable valve according to the embodiment. The vertical axis of FIG. 3A represents an intake air amount QA, and the horizontal axis represents a throttle opening TPO. The characteristic of the intake air amount QA corresponding to the throttle opening TPO is illustrated. The intake air amount QA can be increased with increasing throttle opening TPO. The vertical axis of FIG. 3B represents a valve lift amount VL, and the horizontal axis represents the elapsed time. The stroke (expansion, exhaust, intake, compression) of the engine 100 corresponding to the elapsed time is illustrated in a lower part of FIG. 3B. The exhaust valve 12b can perform opening and closing operations over the exhaust and expansion strokes to the intake stroke. The intake valve 12a can perform opening and closing operations over the exhaust stroke to the compression stroke.

The timing when the exhaust valve lift amount VL starts increasing is defined as the exhaust valve open timing, and the timing when the exhaust valve lift amount VL subsequently decreases to zero as the exhaust valve close timing. A variable mechanism is provided to retard the exhaust valve open timing and the exhaust valve close timing on a time base. The variable amount by the variable mechanism is defined as the exhaust valve retard VTCE.

The timing when the intake valve lift amount VL starts increasing is defined as the intake valve open timing, and the timing when the intake valve lift amount VL subsequently decreases to zero as the intake valve close timing. A variable mechanism is provided to advance the intake valve open timing and the intake valve close timing on a time base. The variable amount by the variable mechanism is defined as the intake valve advance VTCI. In other words, the intake valve 12a and the exhaust valve 12b each include the variable mechanism to change their valve open/close timings.

In the embodiment, the intake valve 12a and the exhaust valve 12b include the variable mechanisms that change the profile of the valve lift amount VL continuously or in stages. However, the embodiment is not limited to this. The variable mechanism may be provided only to the intake valve 12a. Furthermore, a mechanism that makes the valve lift amount VL variable may be provided. The above control of the variable valve 12 and the throttle 5 enables the adjustment of the amount of the intake air amount QA in the combustion chamber 16.

Figure 4A:
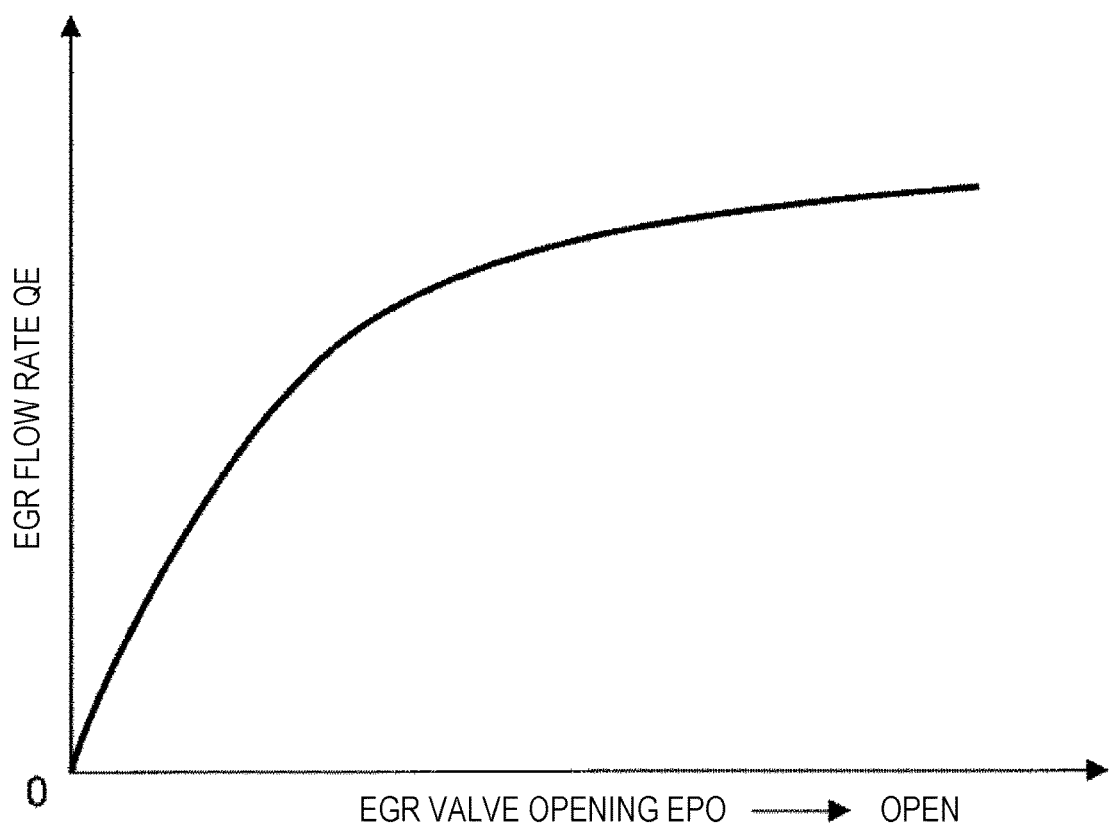
FIG. 4A is a characteristic diagram of an EGR valve according to the first embodiment of the present invention.
Figure 4B:
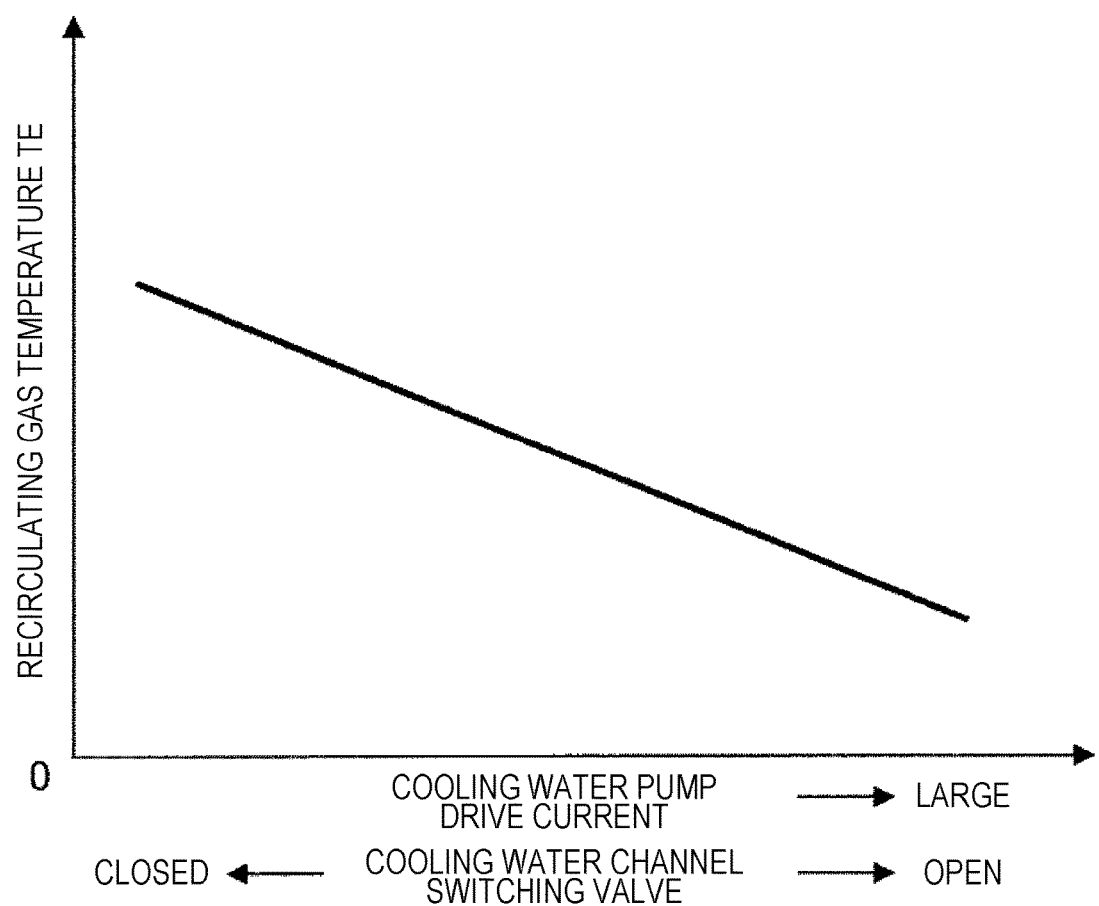
FIG. 4B is a characteristic diagram of a cooling water pump and a cooling water channel switching valve according to the first embodiment of the present invention.

FIG. 4A is a characteristic diagram illustrating the characteristic of the EGR valve according to the embodiment. FIG. 4B is a characteristic diagram illustrating the characteristic of the cooling water pump and the cooling water channel switching valve according to the embodiment. The vertical axis of FIG. 4A represents an EGR flow rate QE. The horizontal axis represents an EGR valve opening EPO. The characteristic of the EGR flow rate QE corresponding to the EGR valve opening EPO is illustrated. The EGR flow rate QE can be increased with increasing EGR valve opening EPO. The vertical axis of FIG. 4B represents a recirculating gas temperature TE. The horizontal axis represents a cooling water pump drive current and a cooling water channel switching valve opening. The characteristic of the recirculating gas temperature TE corresponding to the cooling water pump drives current and the cooling water channel switching valve opening is illustrated. The recirculating gas temperature TE can be reduced with increasing cooling water pump drive current or increasing cooling water channel switching valve opening. The above control of the EGR valve 25, the cooling water pump 28, and the cooling water channel switching valve 29 enables the adjustment of the EGR flow rate QE and the recirculating gas temperature TE in the EGR cooler 26. The cooling water pump 28 and the cooling water channel switching valve 29 constitute a recirculating gas temperature adjustment device which adjusts the temperature of the recirculating exhaust gas. Cooling water or coolant for cooling the engine is used as the cooling water or coolant used in the recirculating gas temperature adjustment device.

Figure 5A:
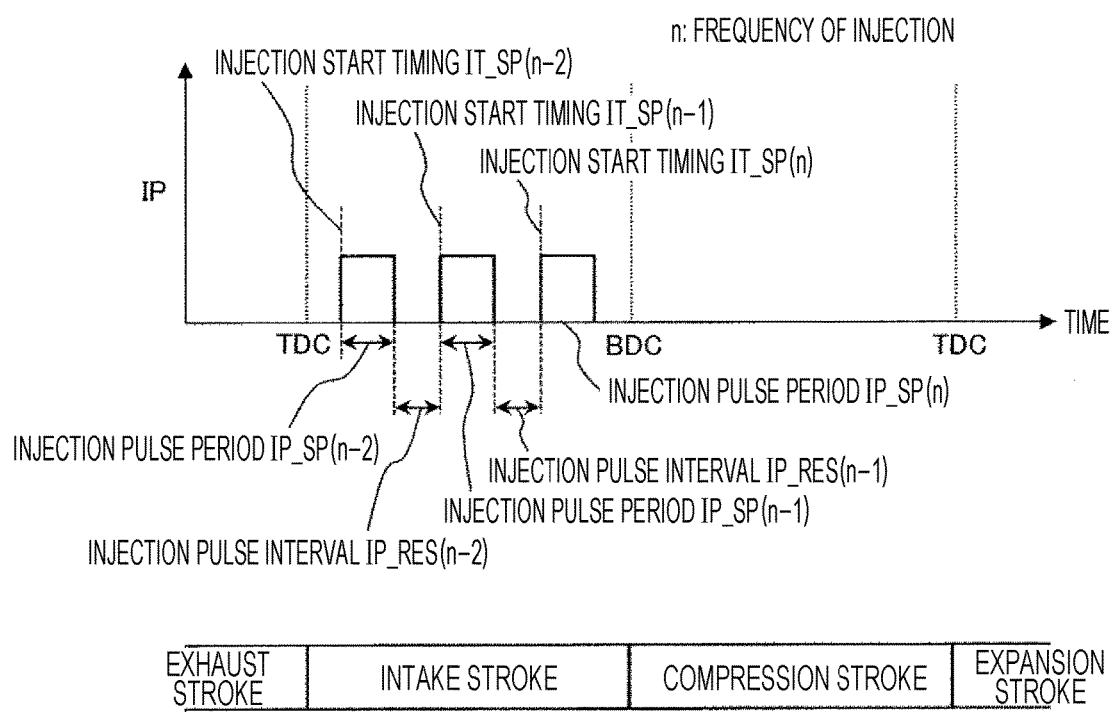
FIG. 5A is a diagram illustrating a form of a command signal (injection command value) of an injector 7 output from an input/output port 50b according to the first embodiment of the present invention.
Figure 5B:
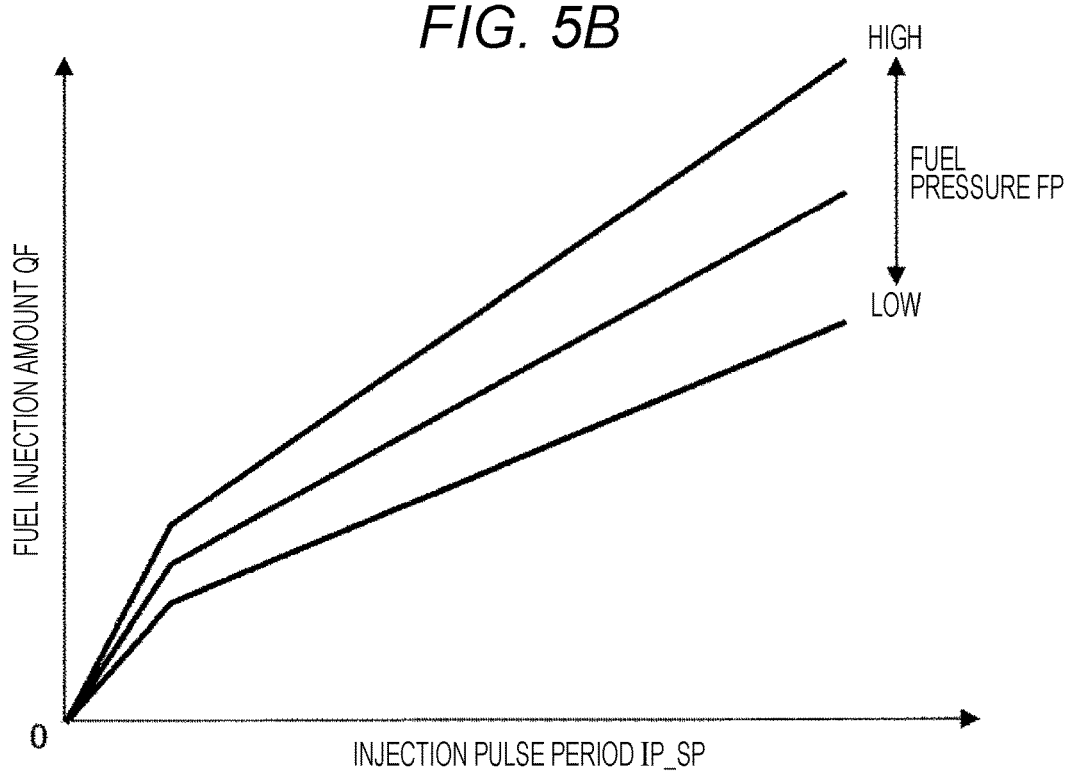
FIG. 5B is a characteristic diagram of the injector 7 according to the first embodiment of the present invention.

FIG. 5A is a diagram illustrating a form of an injection command value of the injector 7 and a command signal output from the input/output port 50b according to the embodiment. FIG. 5B is a characteristic diagram illustrating the characteristic of the injector 7 according to the embodiment. The vertical axis of FIG. 5A represents a voltage IP of an injection pulse. The horizontal axis represents the elapsed time. BDC represents the time when the piston 13 is at bottom dead center. TDC represents the time when the piston 13 is at top dead center. The stroke (exhaust, intake, compression, expansion) of the engine 100 corresponding to the elapsed time is illustrated in a lower part of the figure.

The engine control system according to the present invention can command a plurality of injections. In the figure, an example where three injection pulses are output in the intake stroke is illustrated as a representative example. The first rising edge timing of the plurality of injection pulses in the intake stroke is assumed to be an injection start timing IT_SP (n−2), a period up to a falling edge timing subsequent to the rising edge timing to be a first injection pulse period IP_SP (n−2), and a period up to a rising edge timing of the next injection pulse subsequent to the falling edge timing to be a first injection pulse pause period IP_RES (n−2). The last rising edge timing of the plurality of injection pulses is assumed to be an injection start timing IT_SP (n), and a period up to a falling edge timing subsequent to the last rising edge timing to be the last injection pulse period IP_SP (n). n is the frequency of injection. Moreover, the plurality of injections which are carried out in the compression, expansion, and exhaust strokes can be commanded likewise. However, the plurality of injections are commanded preferably in the intake stroke. The vertical axis of FIG. 5B represents a fuel injection amount QF. The horizontal axis represents the injection pulse period IP_SP. The fuel injection amount QF can be increased with increasing injection pulse period IP_SP. Moreover, this characteristic changes as illustrated in the figure depending on the fuel pressure FP of the common rail 9. In other words, as the fuel pressure FP increases, the fuel injection amount QF for the same injection pulse period IP_SP increases.

Figure 6A:
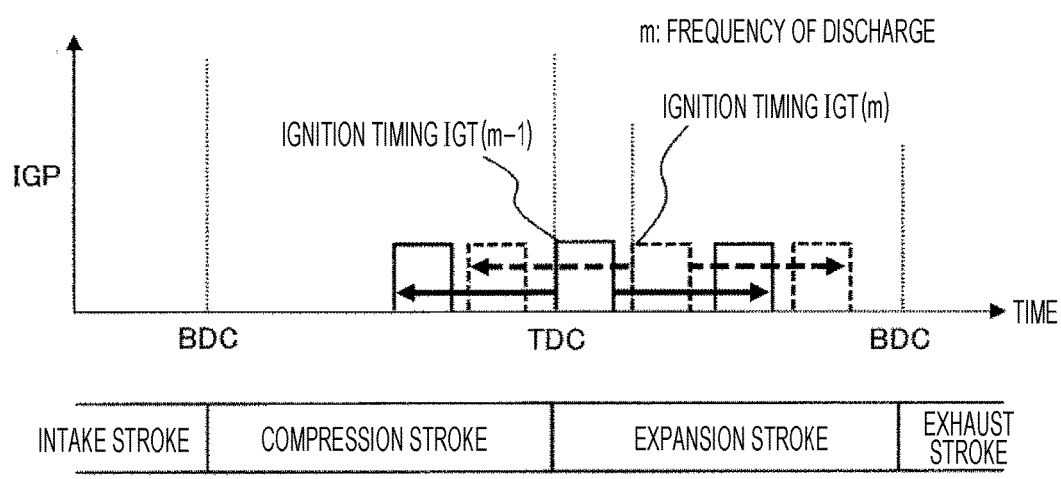
FIG. 6A is a diagram illustrating a form of a command signal (ignition command value) to an ignition coil 19 output from the input/output port 50b according to the first embodiment of the present invention.
Figure 6B:
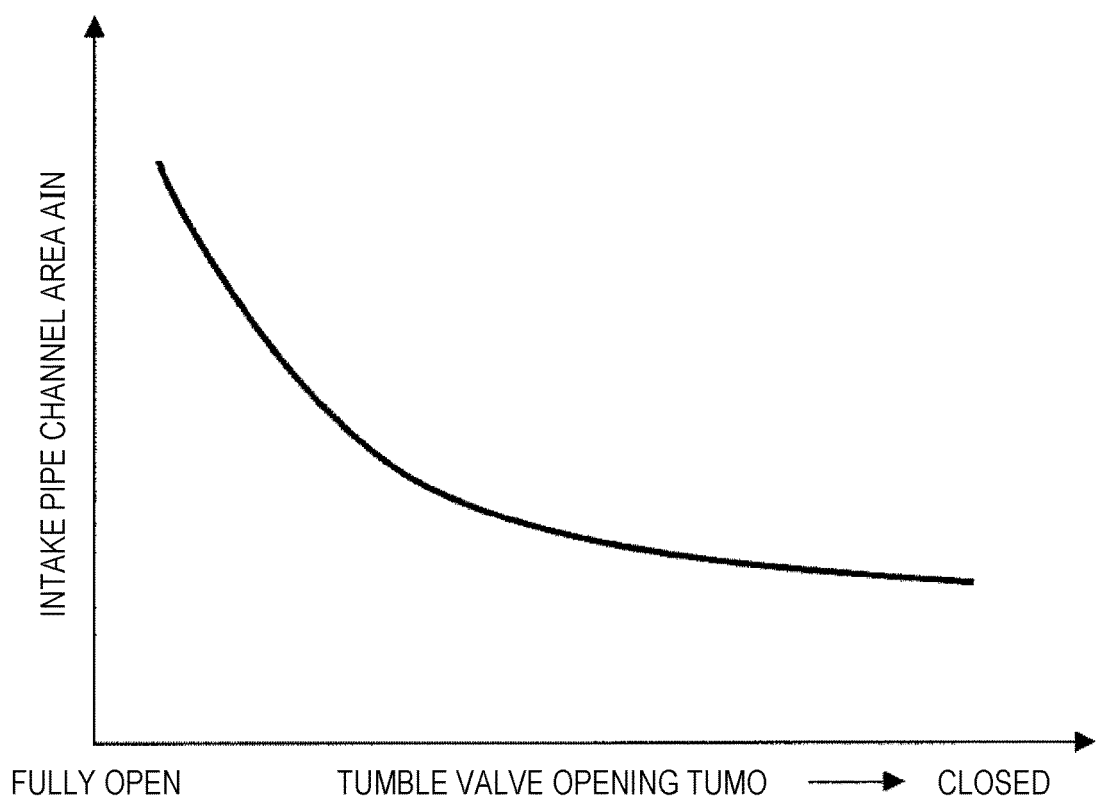
FIG. 6B is a diagram illustrating the characteristic of the change of the area of an intake pipe channel for a command signal (tumble opening command value) to a tumble valve 6 output from the input/output port 50b according to the first embodiment of the present invention.

FIG. 6A is a diagram illustrating a form of an ignition command value of a command signal to the ignition coil 19 output from the input/output port 50b according to the embodiment. FIG. 6B is a characteristic diagram illustrating the characteristic of the area of an intake pipe channel for a tumble opening command value of a command signal to the tumble valve 6 output from the input/output port 50b according to the embodiment. The vertical axis of FIG. 6A represents a voltage IGP of an ignition pulse. The horizontal axis represents the elapsed time. BDC represents the time when the piston 13 is at bottom dead center. TDC represents the time when the piston 13 is at top dead center. The stroke (intake, compression, expansion, exhaust) of the engine 100 corresponding to the elapsed time is illustrated in a lower part of the figure. The engine control system of the embodiment can command a plurality of ignitions. The figure illustrates two ignition pulses as a representative example. The first rising edge timing of the plurality of ignition pulses in the compression stroke is assumed to be an ignition start timing IGT (m−1), and the last rising edge timing of the plurality of ignition pulses to be an ignition start timing IGT (m). m is the frequency of discharge. Moreover, the plurality of ignitions carried out in the intake, expansion, and exhaust strokes can also be commanded likewise. However, the plurality of ignitions are command preferably over the compression stroke to the expansion stroke. The vertical axis of FIG. 6B represents an intake pipe channel area AIN. The horizontal axis represents a tumble valve opening TUMO of the tumble valve 6. The intake pipe channel area AIN can be reduced with changes of the tumble valve opening TUMO from a fully open side toward a closed side (with decreasing tumble valve opening TUMO).

Figure 7:
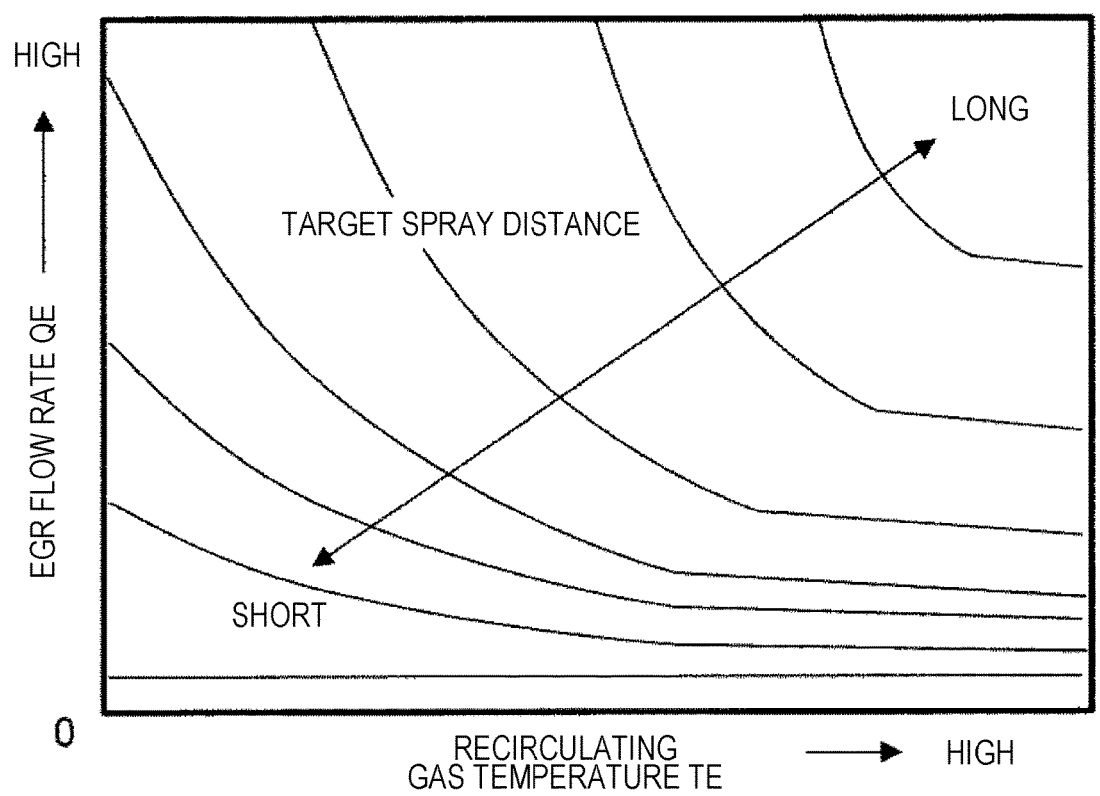
FIG. 7 is a characteristic diagram illustrating the characteristic of a target spray distance PEN in relation to a recirculating gas temperature TE and an EGR flow rate QE according to the first embodiment of the present invention.

FIG. 7 is a characteristic diagram illustrating the characteristic of a target spray distance PEN in relation to the recirculating gas temperature TE and the EGR flow rate QE according to the embodiment. The vertical axis represents the EGR flow rate QE. The horizontal axis represents the recirculating gas temperature TE. There is a characteristic that the target spray distance PEN increases with increasing EGR flow rate QE and increasing recirculating gas temperature TE. In other words, the target spray distance PEN is extended. Moreover, it is preferable to have a characteristic that the target spray distance PEN is not changed if the recirculating gas temperature TE increases when the EGR flow rate QE is zero. Consequently, the miscomputation of the target spray distance PEN is prevented upon false detection of the recirculating gas temperature TE.

Figure 8:
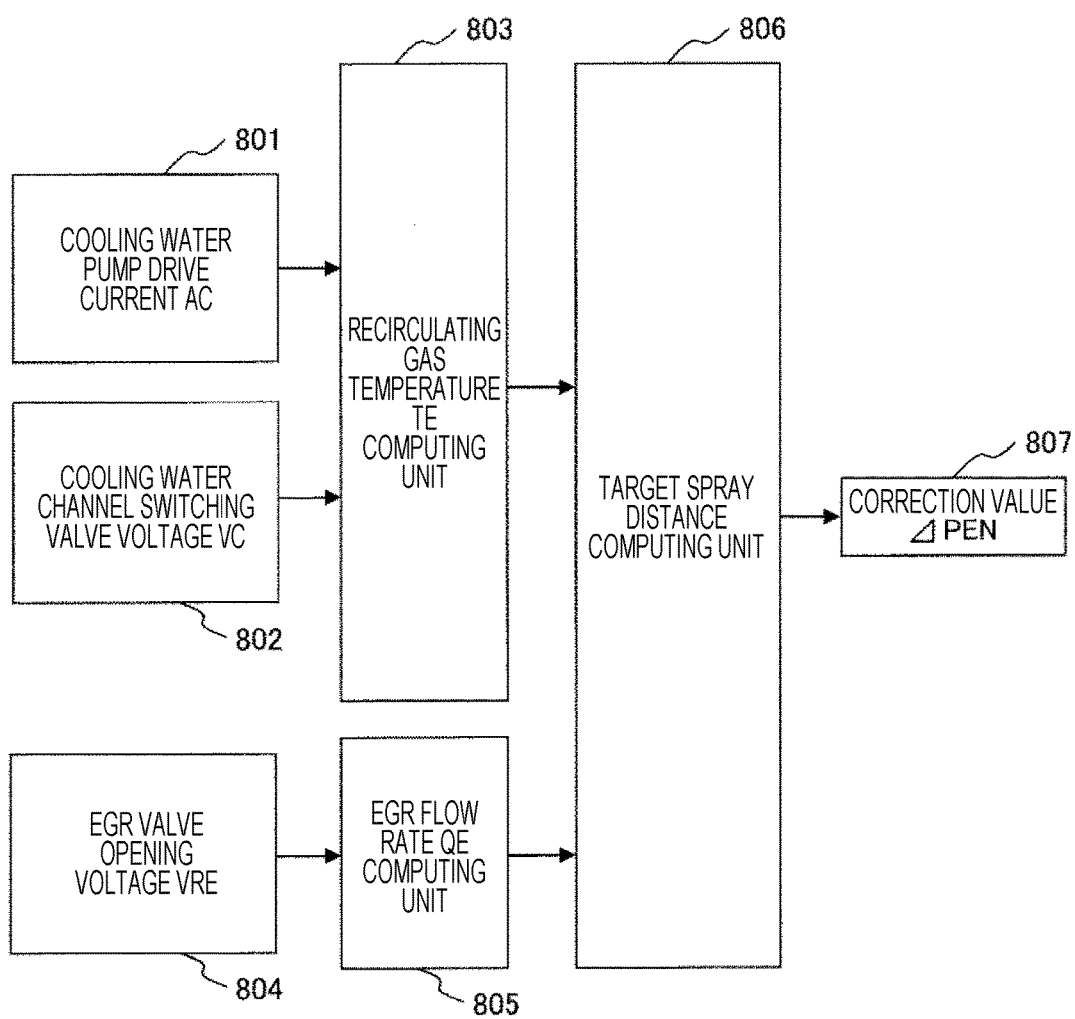
FIG. 8 is a diagram illustrating computation logic of the target spray distance PEN based on the EGR flow rate QE and the recirculating gas temperature TE according to the first embodiment of the present invention.

FIG. 8 is a logic diagram illustrating target spray distance computation logic based on the EGR flow rate QE and the recirculating gas temperature TE according to the embodiment. A cooling water pump drive current AC 801 and a cooling water channel switching valve voltage VC 802 are input into a recirculating gas temperature computing unit 803 to compute the recirculating gas temperature TE based on the characteristic diagram of FIG. 4B. Moreover, an EGR valve opening voltage VRE 804 is input into an EGR flow rate QE computing unit 805 to compute the EGR flow rate QE based on the characteristic diagram of FIG. 4A. The recirculating gas temperature TE and the EGR flow rate QE are input into a target spray distance computing unit 806 to compute the target spray distance PEN based on FIG. 7. Furthermore, a correction value ΔPEN is computed from the target spray distance PEN to output ΔPEN 807 as the computation result.

Figure 9A:
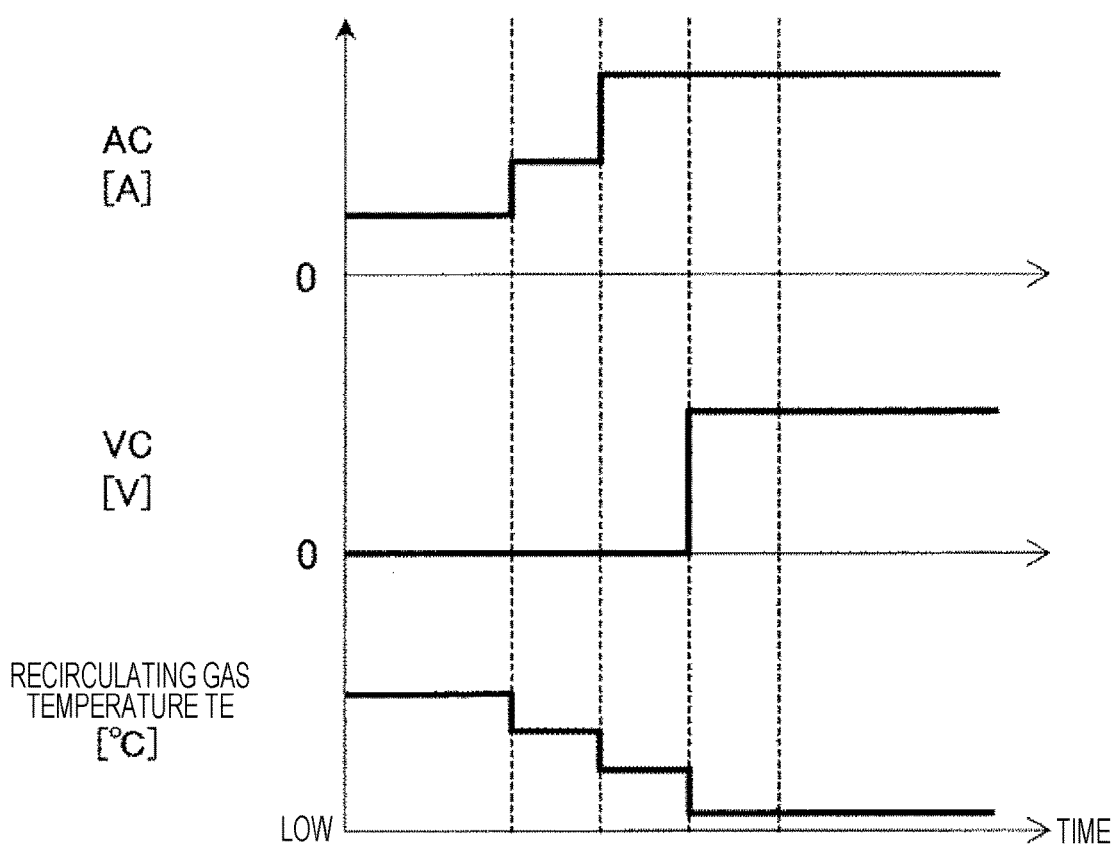
FIG. 9A is a characteristic diagram illustrating the change of the recirculating gas temperature TE upon the change of a cooling water pump drive current AC and a cooling water channel switching valve voltage VC according to the first embodiment of the present invention.
Figure 9B:
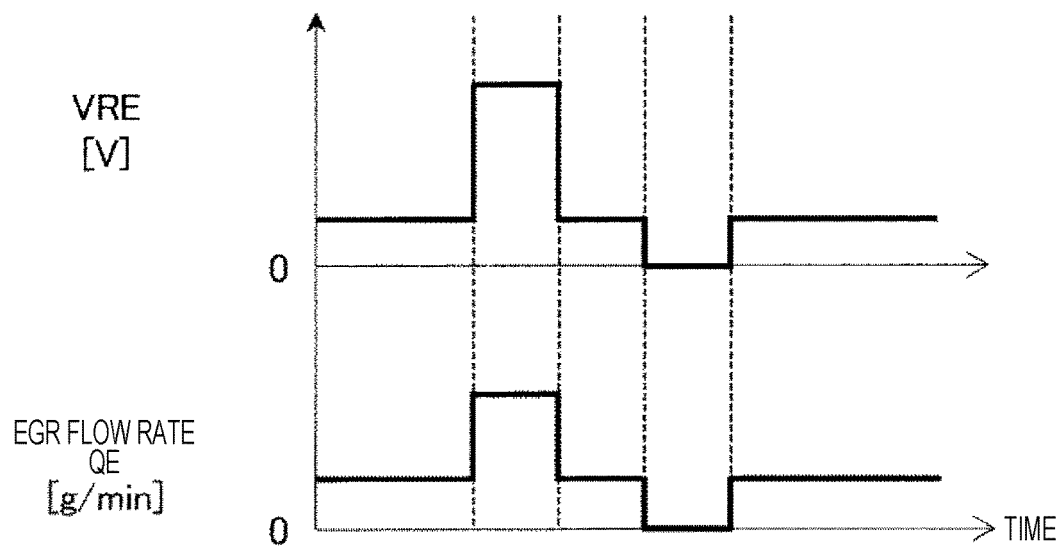
FIG. 9B is a characteristic diagram illustrating the change of the EGR flow rate QE upon the change of an EGR opening voltage VRE according to the embodiment of the present invention.

FIG. 9A is a characteristic diagram illustrating the change of the recirculating gas temperature TE upon the change of the cooling water pump drive current AC and the cooling water channel switching valve voltage VC according to the embodiment. FIG. 9B is a characteristic diagram illustrating the change of the EGR flow rate QE upon the change of the EGR opening voltage VRE according to the embodiment. FIG. 9A illustrates the recirculating gas temperature TE at the time when each of the cooling water pump drive current AC and the cooling water channel switching valve voltage VC is changed. The recirculating gas temperature TE decreases with increasing cooling water pump drive current AC. The recirculating gas temperature TE decreases with increasing cooling water channel switching valve voltage VC and increasing cooling water channel switching valve opening. FIG. 9B illustrates the EGR flow rate QE at the time when the EGR opening voltage VRE is changed. The EGR flow rate QE increases with increasing EGR opening voltage VRE. The EGR flow rate QE decreases with decreasing EGR opening voltage VRE. Moreover, the EGR flow rate QE is zero when the EGR opening voltage VRE is zero, that is, when the EGR opening is fully closed.

Figure 10:
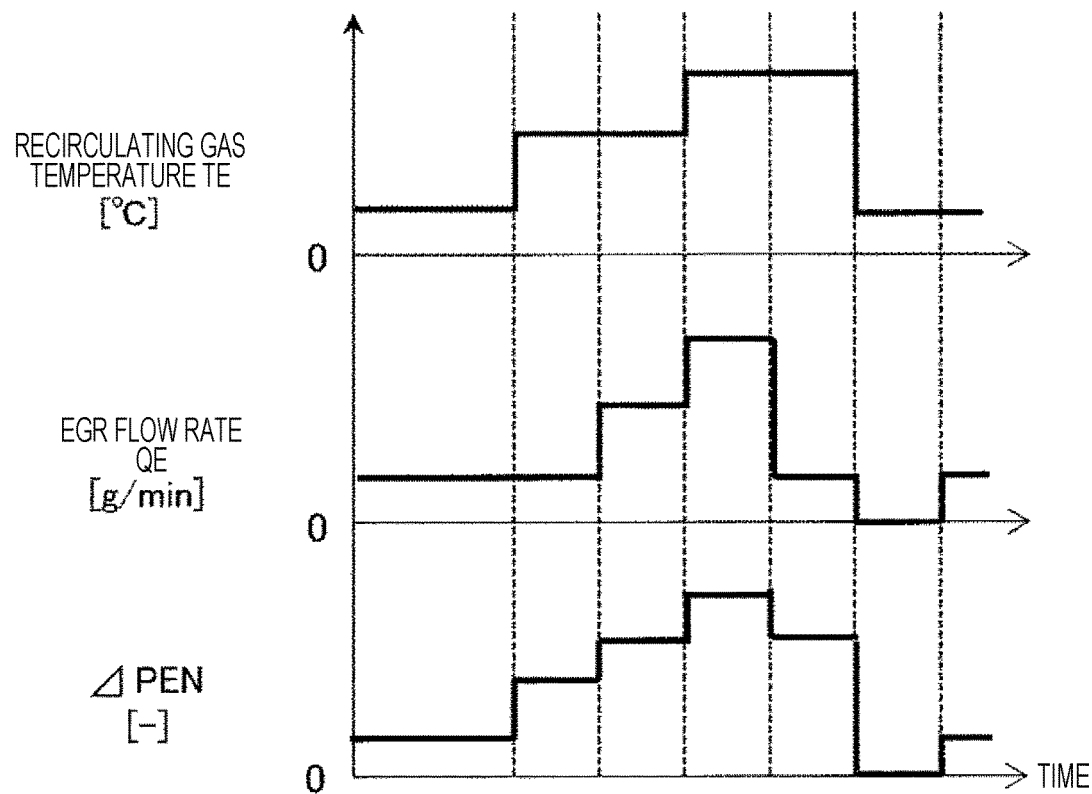
FIG. 10 is a characteristic diagram of computation logic of a correction value ΔPEN of the target spray distance PEN based on the EGR flow rate QE and the recirculating gas temperature TE according to the first embodiment of the present invention.

FIG. 10 is a characteristic diagram of computation logic of the correction value ΔPEN of the target spray distance PEN based on the EGR flow rate QE and the recirculating gas temperature TE according to the embodiment. FIG. 10 illustrates the correction value ΔPEN at the time when each of the recirculating gas temperature TE and the EGR flow rate QE is changed. When the EGR flow rate QE does not change, if the recirculating gas temperature TE increases, the correction value ΔPEN increases. Furthermore, when the recirculating gas temperature TE does not change, if the EGR flow rate QE increases, the correction value ΔPEN increases. Furthermore, if the EGR flow rate QE and the recirculating gas temperature TE are increased, the correction value ΔPEN increases. Moreover, the correction value ΔPEN decreases with decreasing recirculating gas temperature TE and EGR flow rate QE. Furthermore, when the EGR flow rate QE is zero, even if the recirculating gas temperature TE has any value, it is preferable that the correction value ΔPEN be zero. Consequently, also if the recirculating gas temperature TE is falsely detected when the EGR flow rate QE is zero, that is, when the EGR valve is in a fully closed state, a false correction can be prevented. The correction value ΔPEN corresponds to the difference in the target spray distance PEN between before and after the correction.

Figure 11:
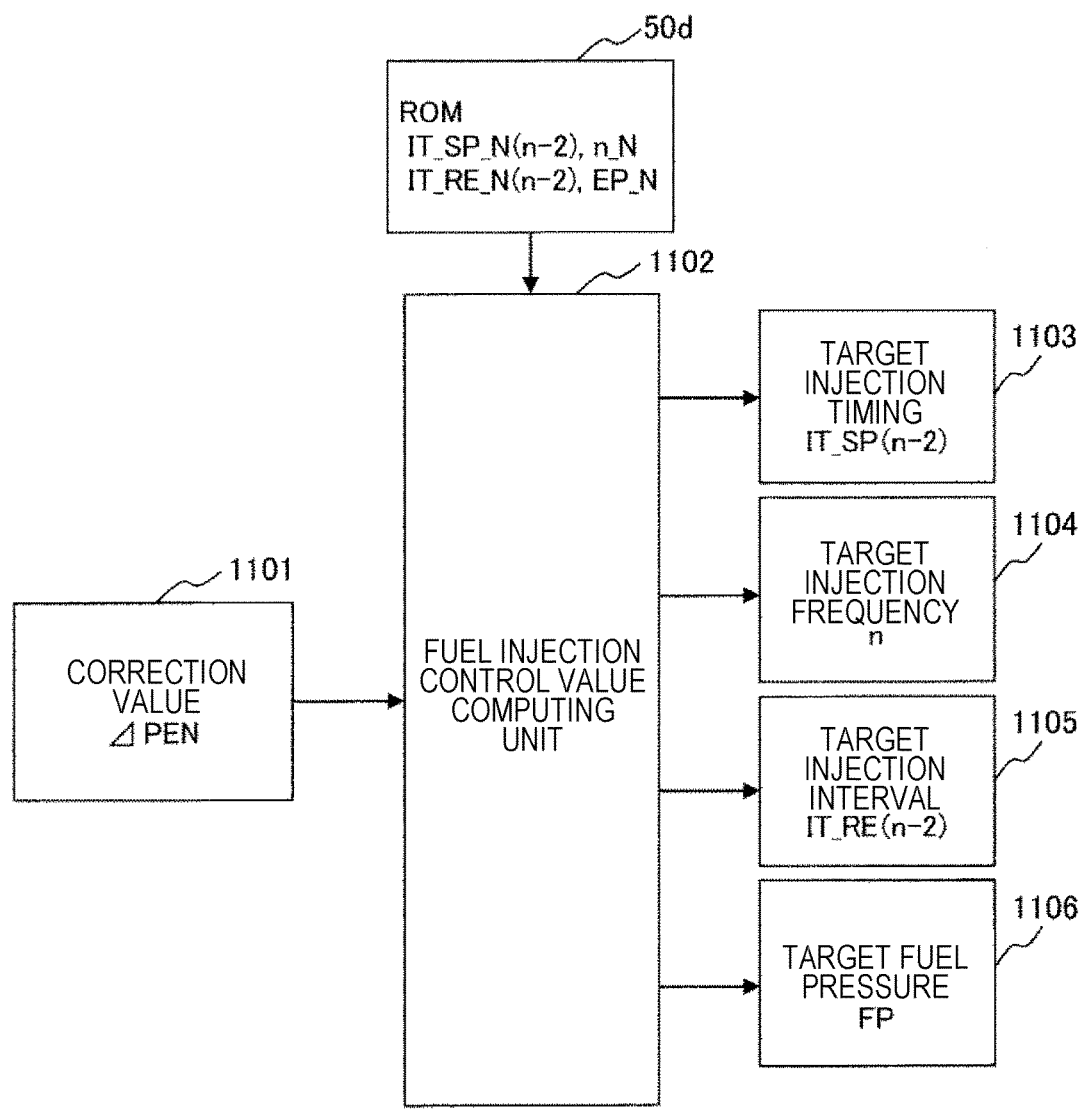
FIG. 11 is a diagram illustrating computation logic of fuel injection control valued based on the EGR flow rate QE and the recirculating gas temperature TE according to the first embodiment of the present invention.

FIG. 11 is a logic diagram illustrating computation logic of fuel injection control values based on the EGR flow rate QE and the recirculating gas temperature TE according to the embodiment. A correction value ΔPEN 1101 is input into a fuel injection control value computing unit 1102 to compute a target injection timing IT_SP (n−2) 1103, a target injection frequency n 1104, a target injection interval IT_RE (n−2) 1105, and a target fuel pressure FP 1106. The control computation results are output here. However, the embodiment is not limited to this. One or more of these computation results may be computed. Moreover, fuel injection control values (a target injection timing IT_SP_N (n−2) 1103, a target injection frequency n_N 1104, a target injection interval IT_RE_N (n−2) 1105, and a target fuel pressure FP N 1106) for generating required torque based on the accelerator opening have been input into the fuel injection control value computing unit 1102.

The target injection timing IT_SP_N (n−2) 1103, the target injection frequency n_N 1104, the target injection interval IT_RE_N (n−2) 1105, and the target fuel pressure FP N 1106 are stored in the ROM 50d. The fuel injection control values are input from a ROM 1107 into the fuel injection control value computing unit 1102. The target injection timing IT_SP_N (n−2) 1103, the target injection frequency n_N 1104, the target injection interval IT_RE_N (n−2) 1105, and the target fuel pressure FP N 1106, which are the fuel injection control values, are computed for correction based on the correction value ΔPEN 1101. Accordingly, the target injection timing IT_SP (n−2) 1103, the target injection frequency n 1104, the target injection interval IT_RE (n−2) 1105, and the target fuel pressure FP 1106, which are the fuel injection control value results, are obtained.

Figure 12:
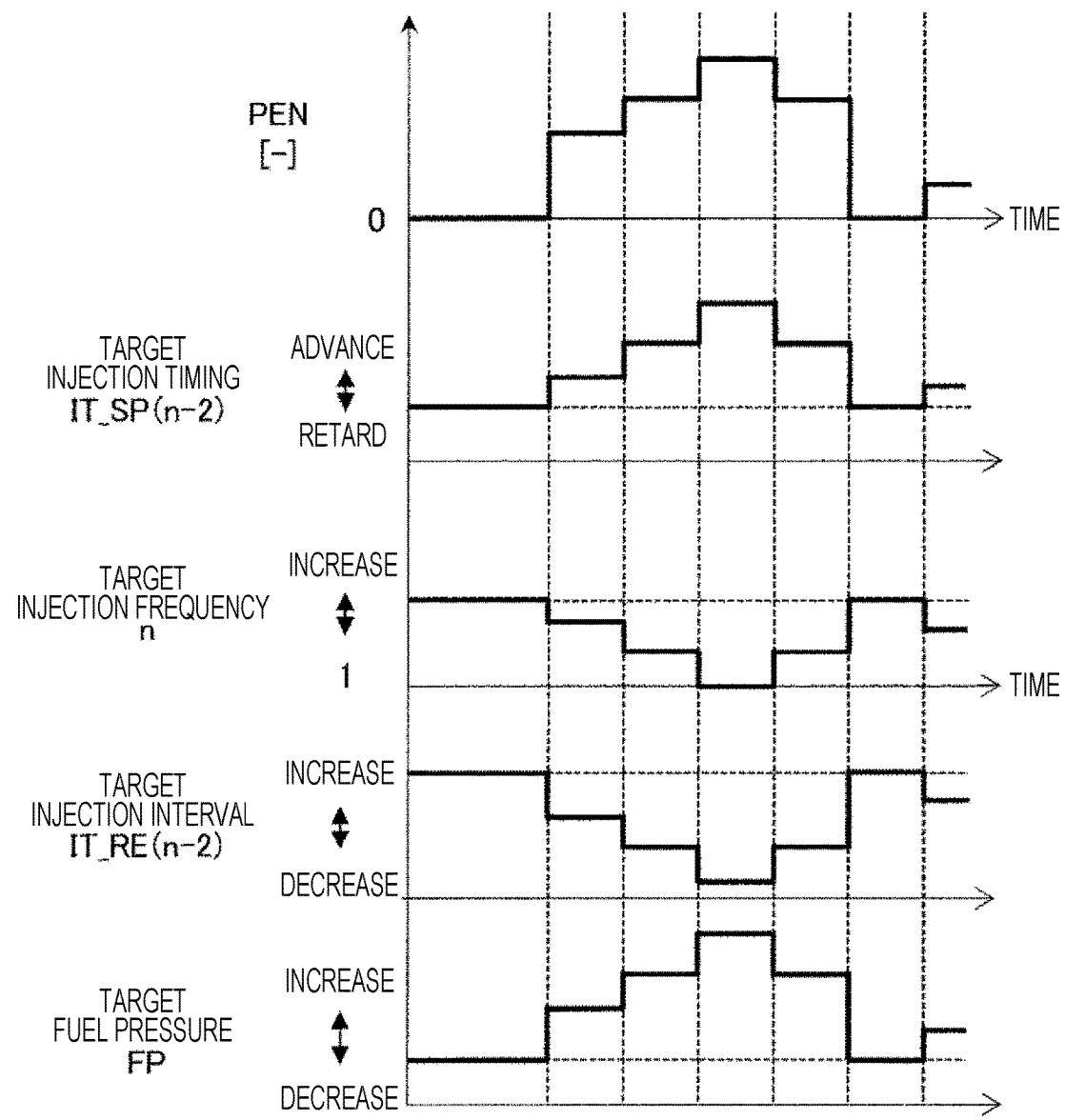
FIG. 12 is a diagram illustrating computation results of the fuel injection control values based on the EGR flow rate QE and the recirculating gas temperature TE according to the first embodiment of the present invention.

FIG. 12 is an example of the fuel injection control value results based on the EGR flow rate QE and the recirculating gas temperature TE according to the embodiment. The characteristics that the target injection timing IT_SP (n−2), the target injection frequency n, the target injection interval IT_RE (n−2), and the target fuel pressure FP are changed according to the correction value ΔPEN are illustrated. When the correction value ΔPEN is zero, the target injection timing IT_SP (n−2), the target injection frequency n, the target injection interval IT_RE (n−2), and the target fuel pressure FP are output based on the fuel injection control values for generating required torque based on the accelerator opening. When the correction value ΔPEN increases, the target injection timing IT_SP (n−2), the target injection frequency n, the target injection interval IT_RE (n−2), and the target fuel pressure FP are corrected in such a manner as to be advanced, reduced, reduced, and increased, respectively, and then output. The control computation results are simultaneously corrected and output here. However, the embodiment is not limited to this. One or more of these computation results may be computed.

Moreover, preferably, it is desired to carryout in order: first, advancing the target injection timing IT_SP (n−2); second, reducing the target injection frequency (n); third, reducing the target injection interval IT_RE (n−2); and fourth, increasing the target fuel pressure FP. This is the increasing order of the amount of energy consumption necessary to increase the target spray distance. In terms of advancing the target injection timing IT_SP (n−2), the injection timing is simply changed so that there is no energy consumption. If the target divided injection frequency (n) is reduced, the switching of injection control occurs upon the change of the frequency. Accordingly, the loss of energy consumption equal to several combustions occurs. In terms of reducing the target injection interval IT_RE (n−2), the injection interval is reduced. Accordingly, the intervals between injections are reduced so that charging of power for opening the valve of the injector is required at an early stage to slightly increase the energy consumption. Furthermore, in terms of increasing the target fuel pressure FP, the energy for driving the fuel pump increases, and accordingly the energy consumption increases. From the above viewpoints, it is preferable to carryout in order: first, advancing the target injection timing IT_SP (n−2); second, reducing the target injection frequency (n); third, reducing the target injection interval IT_RE (n−2); and fourth, increasing the target fuel pressure FP.

Figure 13:
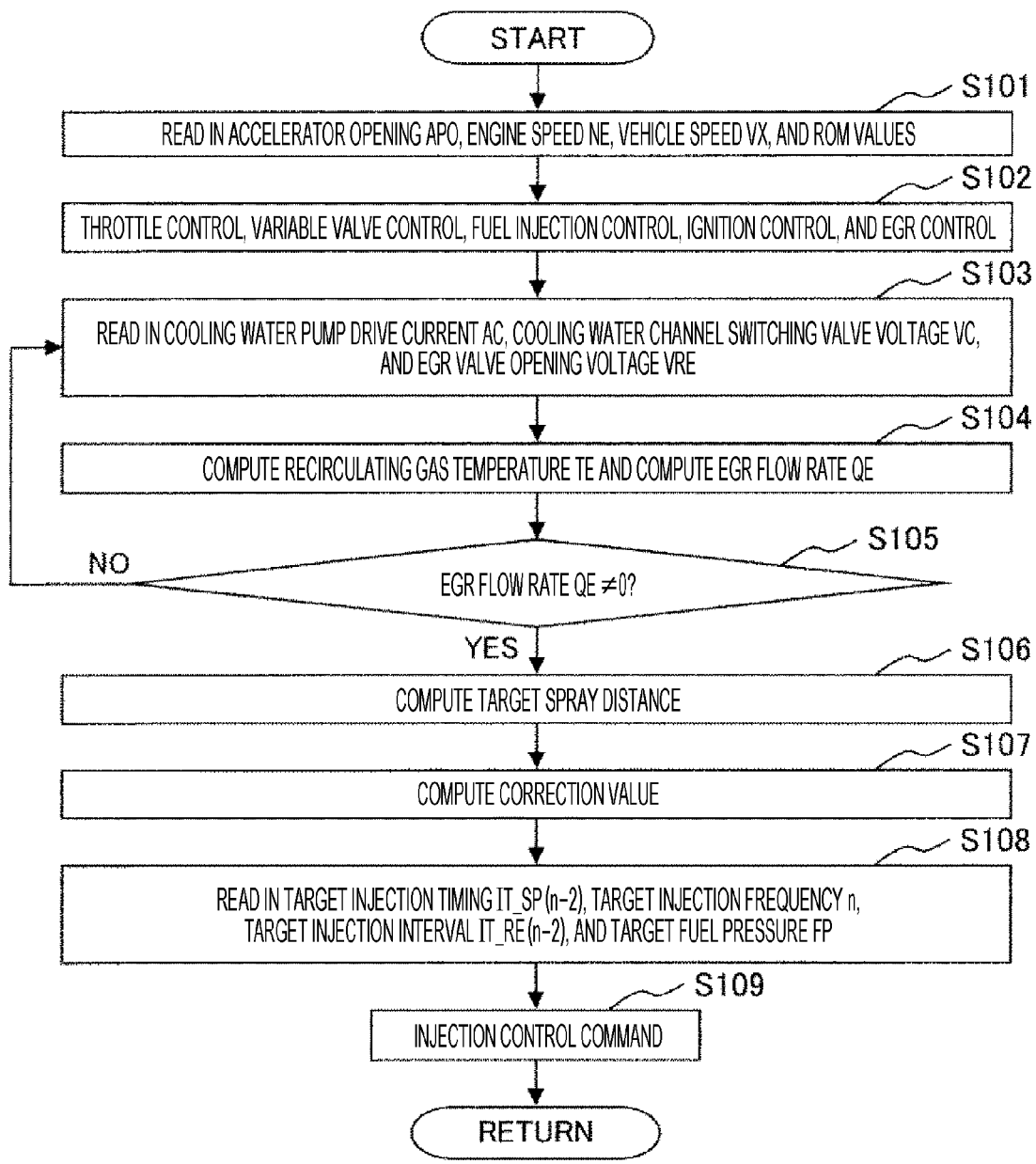
FIG. 13 is a flowchart illustrating contents of control in the ECU 1 according to the first embodiment of the present invention.

FIG. 13 is a flowchart illustrating contents of control in the ECU 1 according to the embodiment. The ECU 1 repeatedly executes the control contents illustrated in FIG. 13 in predetermined cycles.

In the ECU 1, in Step S101, an accelerator opening APO, the engine speed NE, a vehicle speed VX, the values written in the ROM 50d in the ECU 1, and the like are read in. The required torque for the engine 100 is calculated based on an output signal of the accelerator opening sensor 2.

Next, in Step S102, the throttle 5, the tumble valve 6, the variable valve 12, the EGR valve 25, the cooling water pump 28, and the cooling water channel switching valve 29 are controlled in such a manner as to achieve an appropriate intake air amount QA, EGR flow rate QE, and recirculating gas temperature TE based on the result of Step S101, based on which the injector 7, the fuel pump 8, and the ignition coil 19 are controlled.

Next, in Step S103, the ECU 1 reads in the cooling water pump drive current AC, the cooling water channel switching valve voltage VC, and the EGR valve opening voltage VRE.

Next, in Step S104, the ECU 1 computes the recirculating gas temperature TE and the EGR flow rate QE.

Next, in Step S105, the ECU 1 determines whether or not the EGR flow rate QE is zero. If the EGR flow rate QE is zero, then proceed to NO, and proceed to Step S103. If YES, then proceed to Step 106.

Next, in Step S106, the target spray distance is computed.

Next, in Step S107, the correction value is computed to output the target injection timing IT_SP (n−2), the target injection frequency n, the target injection interval IT_RE (n−2), and the target fuel pressure FP.

Next, in Step S108, the outputs of the target injection timing IT_SP (n−2), the target injection frequency n, the target injection interval IT_RE (n−2), and the target fuel pressure FP are read in.

Next, in Step S109, injection control is performed based on the outputs.

The ECU 1 performs the above flow in predetermined cycles.

In the embodiment, at least one of the following controls (1) to (4) is performed based on at least one of the EGR flow rate QE and the recirculating gas temperature TE. Accordingly, it is possible to extend the penetration and widely distribute the fuel in the combustion chamber. In other words, when the temperature of the exhaust gas to be recirculated by the recirculation device is high as opposed to when the temperature is low, or when the amount of the exhaust gas to be recirculated by the recirculation device is large as opposed to when the amount is small, at least one of the following controls (1) to (4) is performed:

(1) Advance the injection timing IT_SP (n−2),
(2) Reduce the injection frequency n,
(3) Reduce the injection interval IT_RE (n−2), and
(4) Increase the fuel pressure FP.

Second Embodiment

Next, a second embodiment of the present invention is described using FIGS. 14, 15A, 15B, 16A, 16B, 17A, 17B, 17C, 18A, 18B, and 19. In the embodiment, the system described in FIG. 1 is used as the automobile engine system. Moreover, the configuration described in FIG. 2 is used as the ECU 1.

Figure 14:
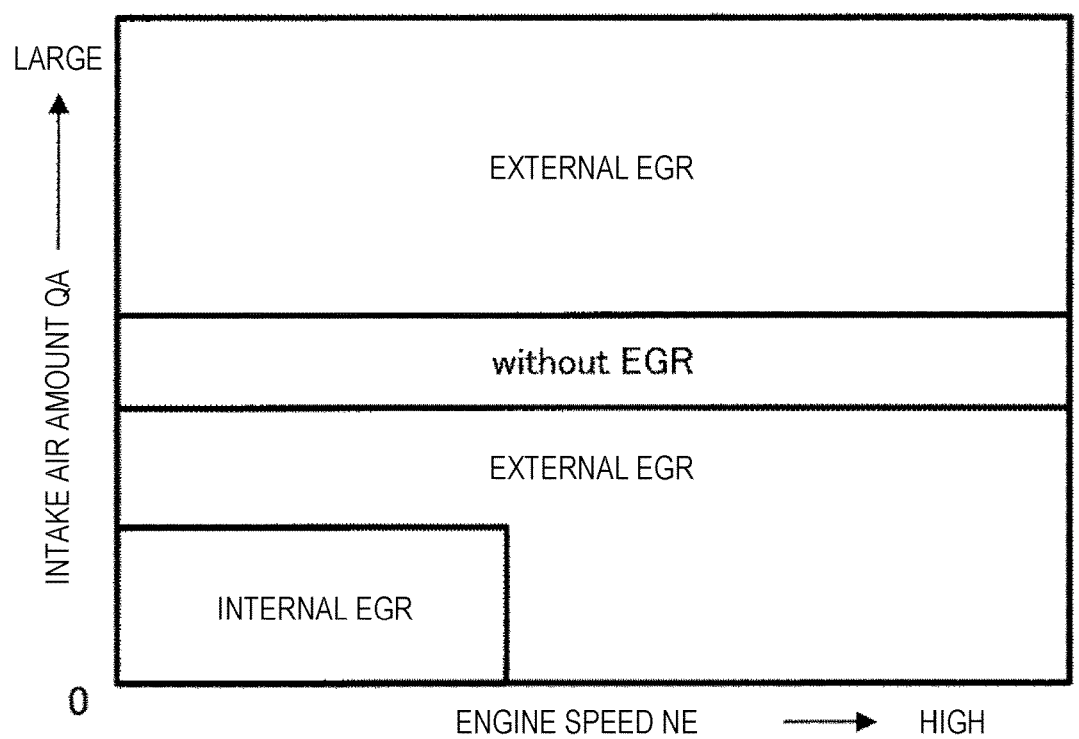
FIG. 14 is a diagram illustrating the characteristic of EGR control based on an intake air amount QA and an engine speed NE according to a second embodiment of the present invention.

FIG. 14 is a characteristic diagram of EGR control based on an intake air amount QA and an engine speed NE according to the embodiment. The vertical axis represents the intake air amount QA. The horizontal axis represents the engine speed NE. The EGR control determines an internal EGR range, an external EGR range, and a no-EGR (without EGR) range according to the intake air amount QA and the engine speed NE. At this point in time, the internal EGR controls the EGR flow rate with the variable intake and exhaust valve 12. The external EGR controls the EGR flow rate with the EGR valve 25.

Figure 15A:
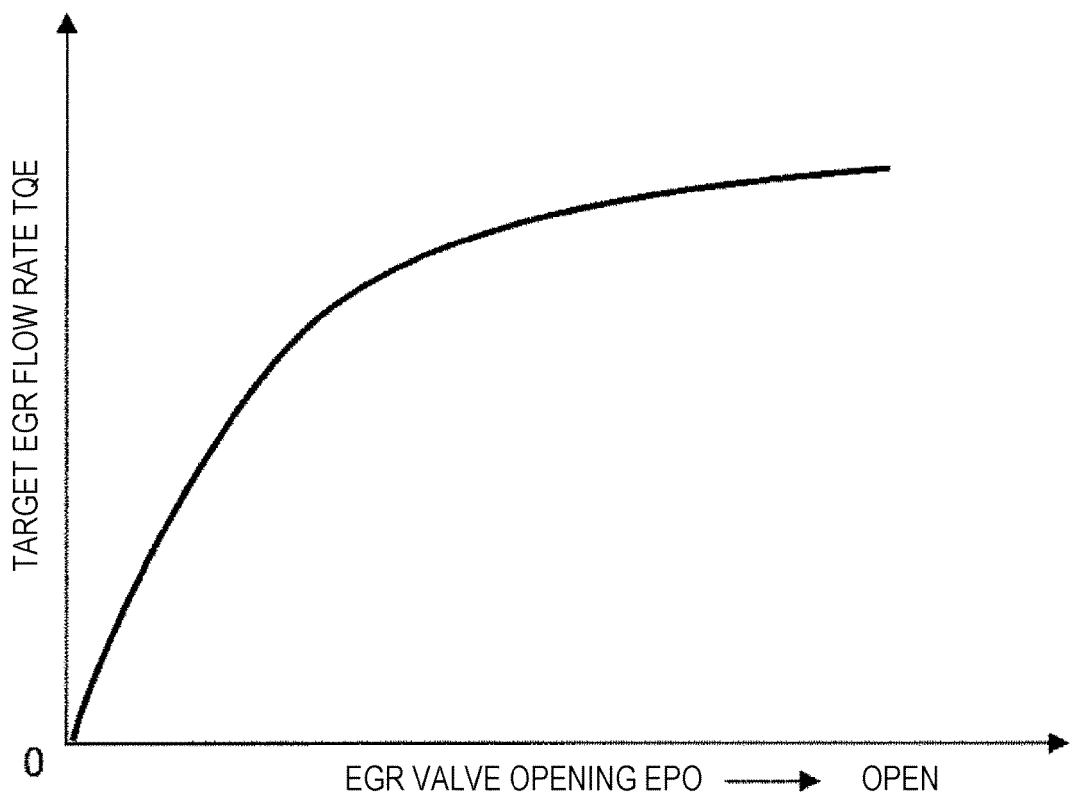
FIG. 15A is a characteristic diagram illustrating the characteristic of an EGR valve according to the second embodiment of the present invention.
Figure 15B:
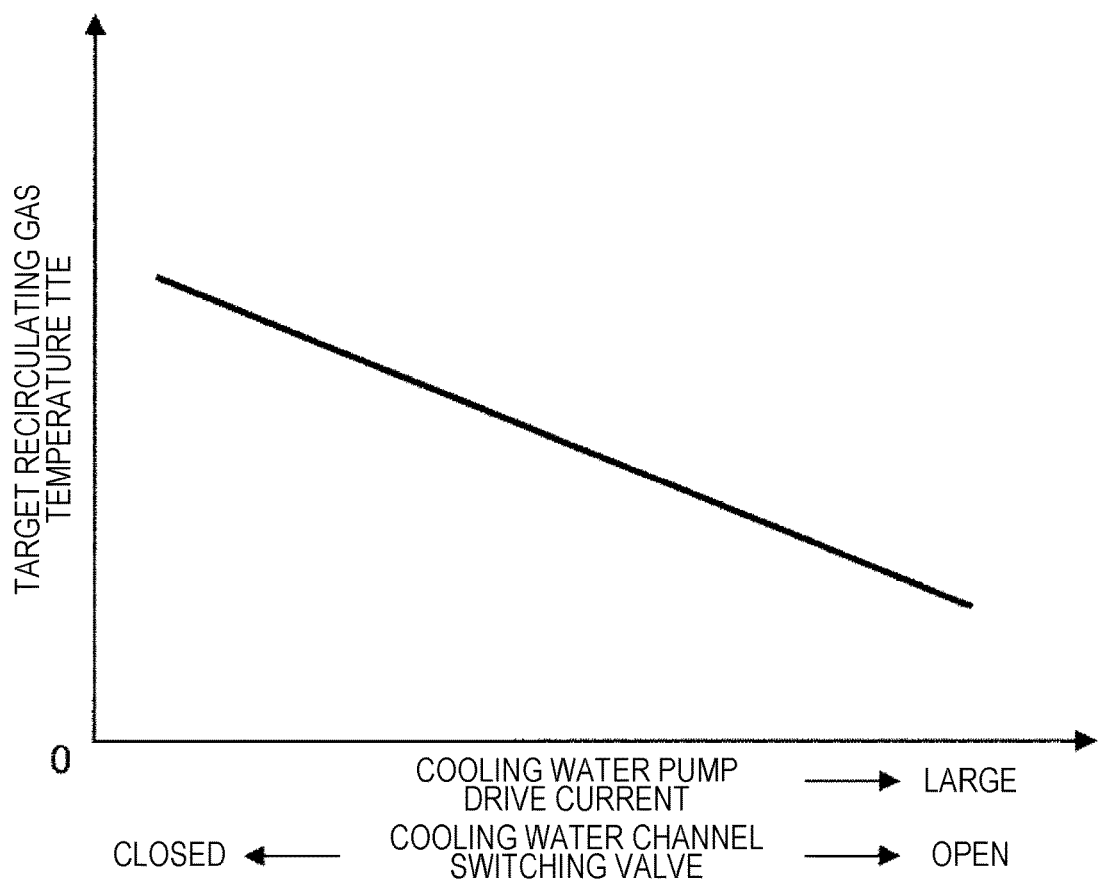
FIG. 15B is a characteristic diagram illustrating the characteristic of a cooling water pump and a cooling water channel switching valve according to the second embodiment of the present invention.

FIG. 15A is a characteristic diagram illustrating the characteristic of the EGR valve according to the embodiment. FIG. 15B is a characteristic diagram illustrating the characteristic of the cooling water pump and the cooling water channel switching valve according to the embodiment. The vertical axis of FIG. 15A represents a target EGR flow rate TQE. The horizontal axis represents an EGR valve opening EPO. The characteristic of the EGR valve opening EPO corresponding to the target EGR flow rate TQE is illustrated. The EGR valve opening EPO is increased when the target EGR flow rate TQE increases. Accordingly, the target EGR flow rate TQE can be achieved. The vertical axis of FIG. 15B represents a target recirculating gas temperature TTE. The horizontal axis represents the characteristic of a cooling water pump drive current and a cooling water channel switching valve opening. When the target recirculating gas temperature TTE decreases, the cooling water pump drive current or cooling water channel switching valve opening is increased. Accordingly, the recirculating gas temperature TTE can be decreased.

Figure 16A:
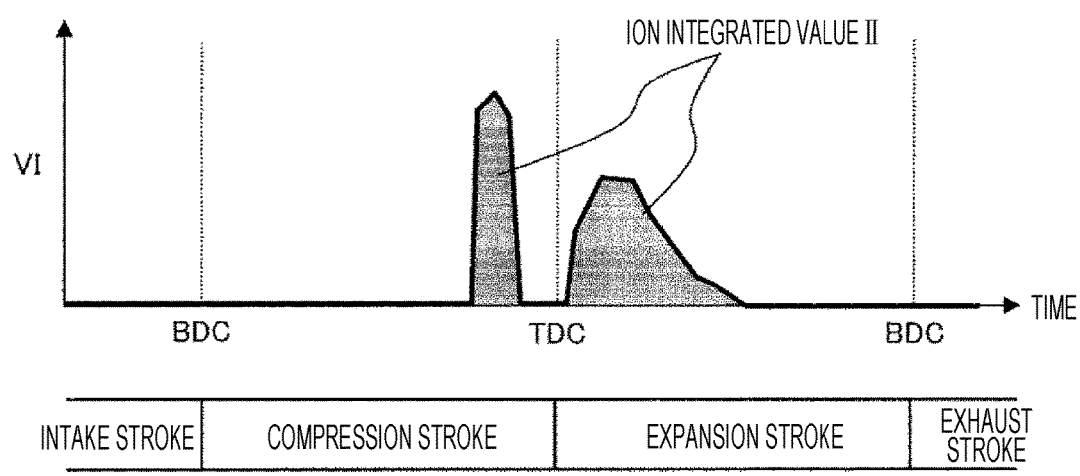
FIG. 16A is a characteristic diagram illustrating the characteristic of an ion sensor 20 according to the second embodiment of the present invention.
Figure 16B:
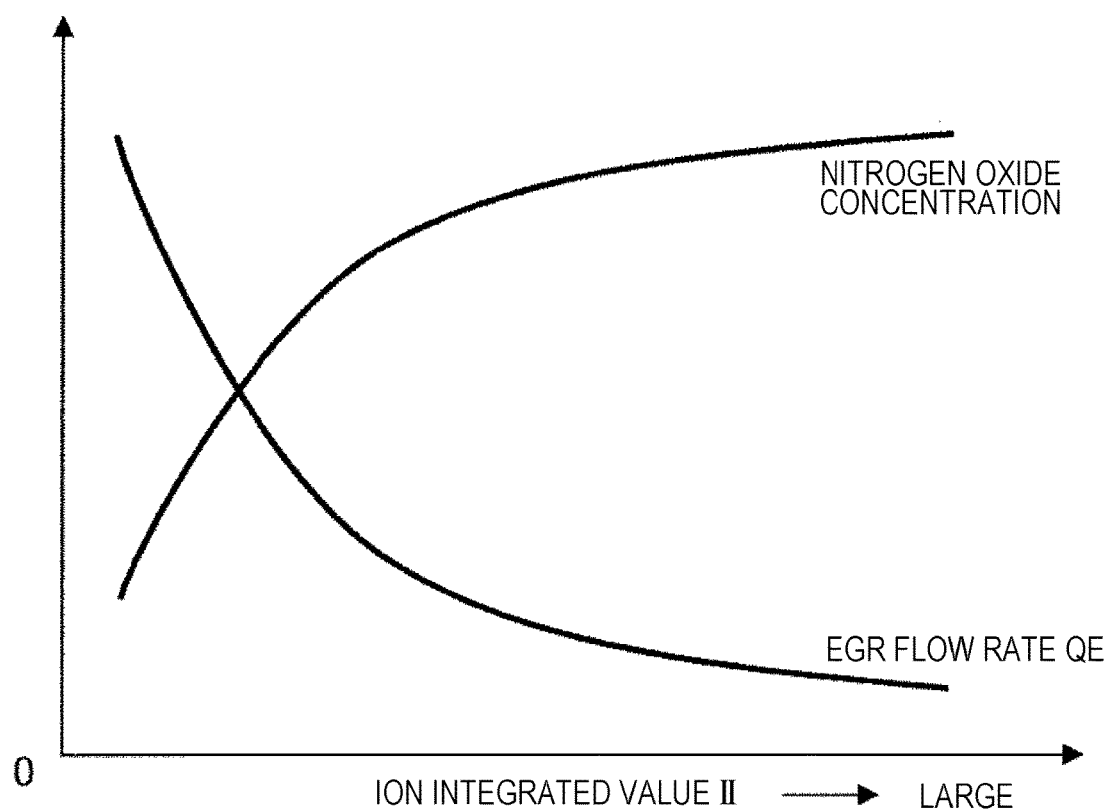
FIG. 16B is a characteristic diagram illustrating the characteristics of an EGR flow rate QE and nitrogen oxide concentration in relation to an ion integrated value II according to the second embodiment of the present invention.

FIG. 16A is a characteristic diagram illustrating the characteristic of the ion sensor 20 according to the embodiment. FIG. 16B is a characteristic diagram illustrating the characteristics of the EGR flow rate QE and nitrogen oxide concentration in relation to an ion integrated value II according to the embodiment. The vertical axis of FIG. 16A represents an ion sensor voltage VI. The horizontal axis represents the time. The ion sensor voltage VI outputs an amplitude signal illustrated in the figure over the compression stroke to the expansion stroke. The output illustrated here is an example, and changes depending on the operating state of the engine 100. The value obtained by integrating the ion sensor voltage VI over the compression stroke to the expansion stroke is defined as the ion integrated value II. In the ECU 1, the ion integrated value II is computed.

The vertical axis of FIG. 16B represents the EGR flow rate QE and the nitrogen oxide concentration. The horizontal axis represents the ion integrated value II. The nitrogen oxide concentration increases with increasing ion integrated value II. This is because the ion sensor 20 detects nitrogen oxide ions resulting from the thermal dissociation of nitrogen in the air that is generated when the temperature is increased to a higher degree due to a chemical reaction occurring in the combustion chamber 16. In this case, when the EGR flow rate QE decreases, the specific heat and thermal capacity of the combustible mixture in the combustion chamber 16 are reduced. Accordingly, the temperature is increased to a higher degree. Hence, the nitrogen oxide concentration increases and the ion integrated value II increases. Moreover, when the EGR flow rate QE increases, the specific heat and thermal capacity of the combustible mixture in the combustion chamber 16 increase. Accordingly, the temperature decreases. Hence, the nitrogen oxide concentration decreases and the ion integrated value II decreases. In other words, the EGR flow rate QE can be detected in accordance with the increase/decrease of the ion integrated value II.

Figure 17A:
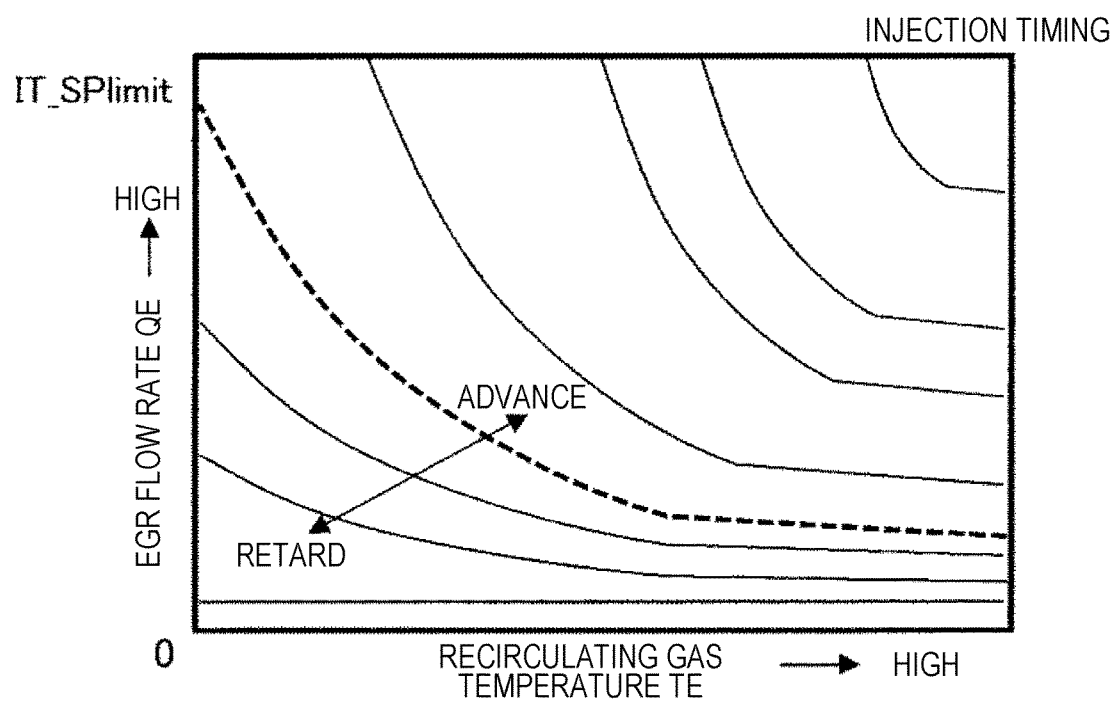
FIG. 17A is a characteristic diagram illustrating the characteristic of an injection timing based on the EGR flow rate QE and a recirculating gas temperature TE according to the second embodiment of the present invention.
Figure 17B:
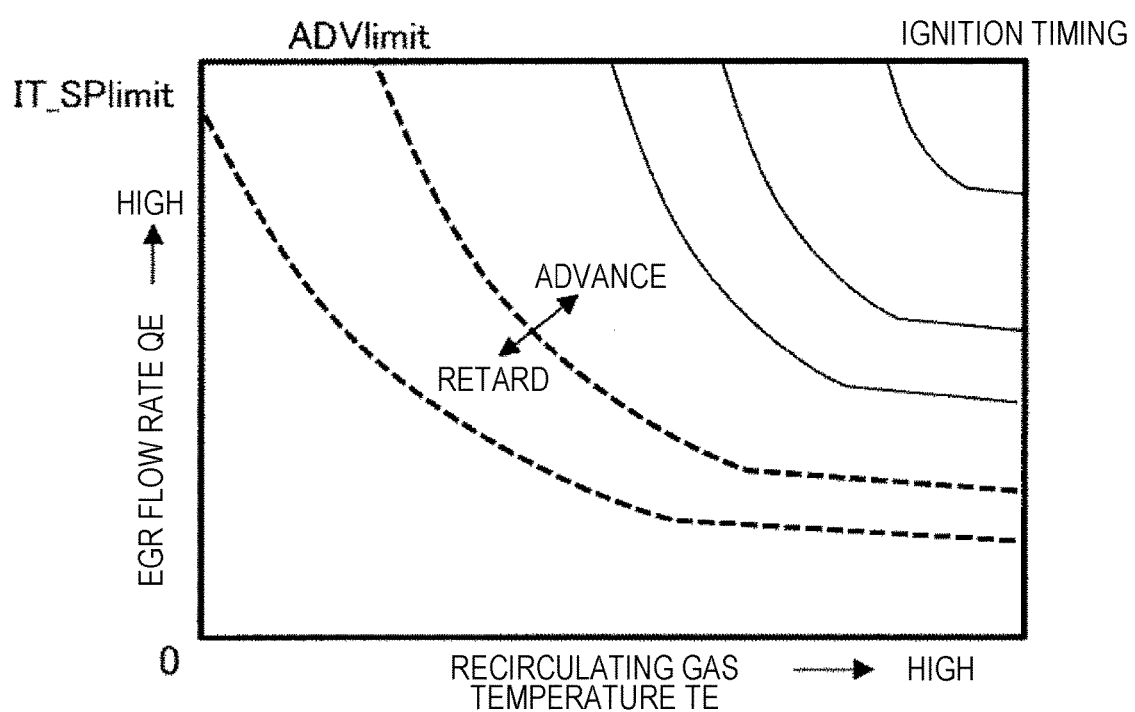
FIG. 17B is a characteristic diagram illustrating the characteristic of an ignition timing based on the EGR flow rate QE and the recirculating gas temperature TE according to the second embodiment of the present invention.
Figure 17C:
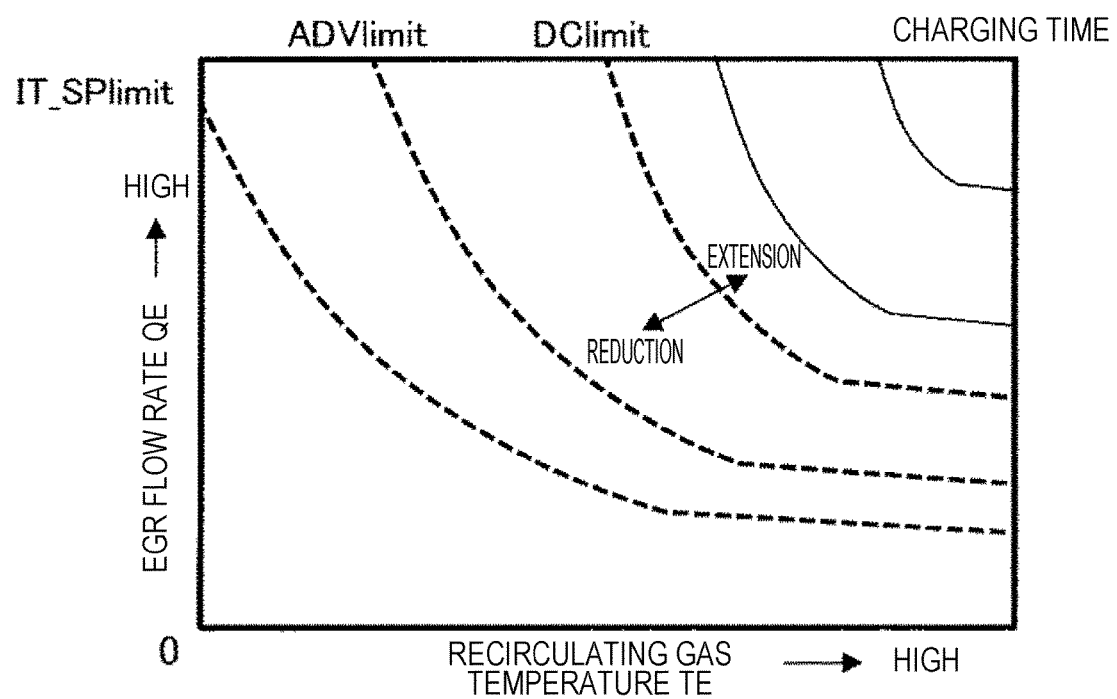
FIG. 17C is a characteristic diagram illustrating the characteristic of charging time based on the EGR flow rate QE and the recirculating gas temperature TE according to the second embodiment of the present invention.
Figure 18A:
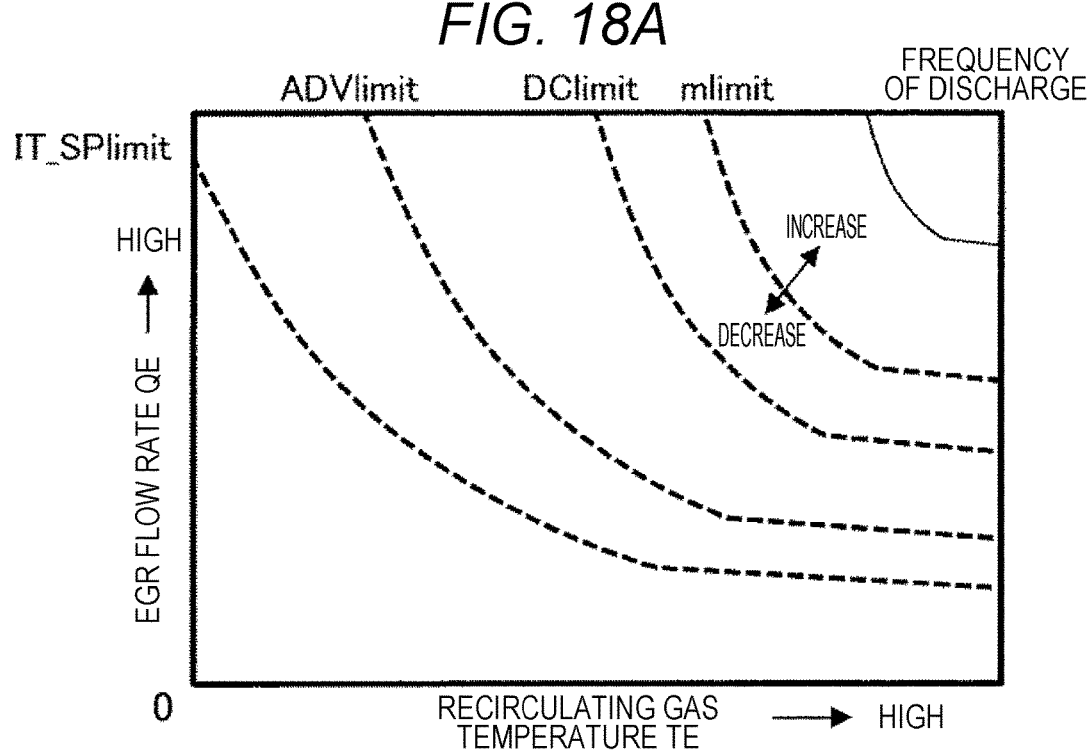
FIG. 18A is a characteristic diagram illustrating the characteristic of the frequency of discharge based on the EGR flow rate QE and the recirculating gas temperature TE according to the second embodiment of the present invention.
Figure 18B:
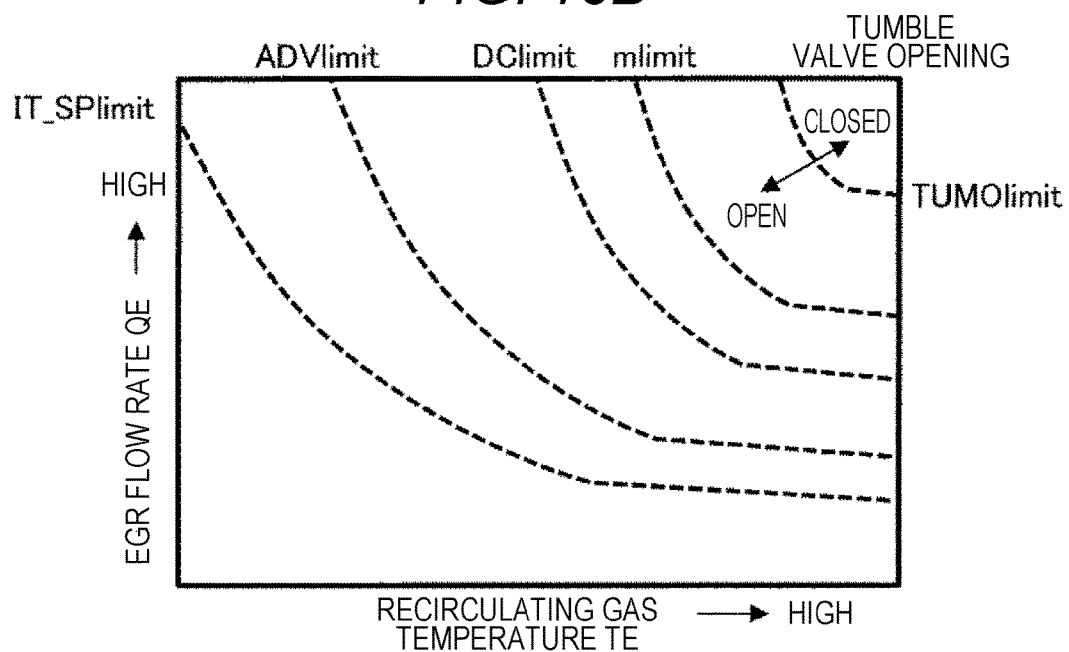
FIG. 18B is a characteristic diagram illustrating the characteristic of a tumble valve opening based on the EGR flow rate QE and the recirculating gas temperature TE according to the second embodiment of the present invention.

FIGS. 17A, 17B, and 17C are characteristic diagrams illustrating the characteristics of the injection timing, the ignition timing, and the charging time based on the EGR flow rate QE and the recirculating gas temperature TE according to the embodiment. FIGS. 18A and 18B are characteristic diagrams illustrating the characteristics of the frequency of discharge and the tumble valve opening based on the EGR flow rate QE and the recirculating gas temperature TE according to the embodiment.

The injection timing is advanced with increasing EGR flow rate QE and recirculating gas TE based on FIG. 17A. Moreover, if there is an advance request which exceeds an injection timing advance limit IT_SPlimit, the ignition timing is advanced with increasing EGR flow rate QE and recirculating gas TE based on FIG. 17B. Moreover, if there is an advance request which exceeds an ignition timing advance limit ADVlimit, the charging time is extended with increasing EGR flow rate QE and recirculating gas TE based on FIG. 17C. Moreover, if there is a charging time request which exceeds a charging time limit DClimit, the frequency of discharge is increased with increasing EGR flow rate QE and recirculating gas TE based on FIG. 18A. Moreover, if there is a discharge frequency request which exceeds a discharge frequency limit mlimit, the tumble valve opening is more closed with increasing EGR flow rate QE and recirculating gas TE based on FIG. 18B. Moreover, if there is a tumble valve opening request which exceeds a tumble valve opening limit TUMOlimit, the EGR control is prohibited.

Figure 19:
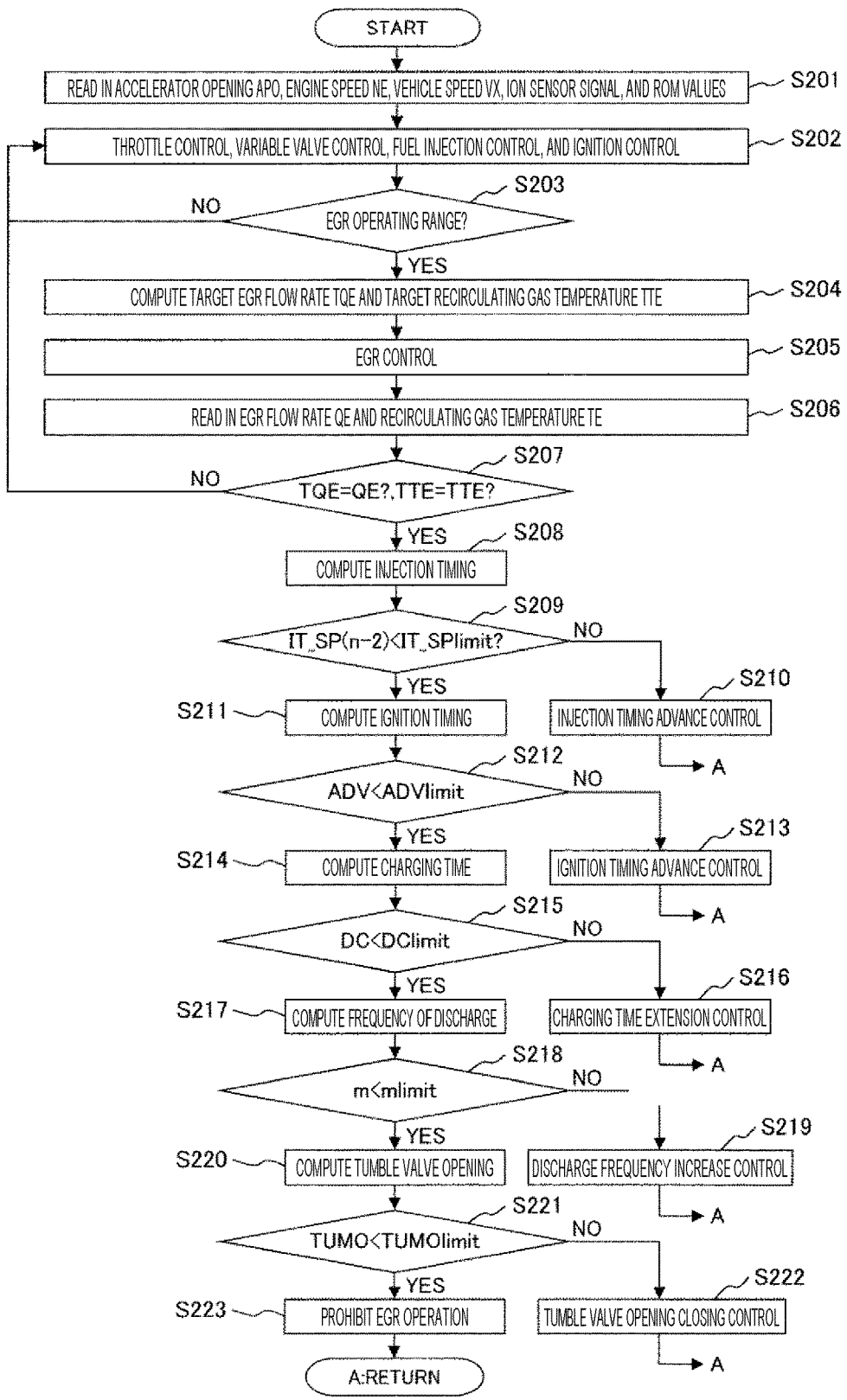
FIG. 19 is a flow chart illustrating contents of control in an ECU 1 according to the second embodiment of the present invention.

FIG. 19 is a flow chart illustrating contents of control in the ECU 1 according to the embodiment. The ECU 1 repeatedly executes the control contents illustrated in FIG. 19 in predetermined cycles. In Step S201, an accelerator opening APO, the engine speed NE, a vehicle speed VX, an ion sensor signal, the values written in the ROM in the ECU 1, and the like are read in the ECU 1. Required torque for the engine 100 is calculated based on an output signal of the accelerator opening sensor 2.

Next, in Step S202, the throttle 5, the tumble valve 6, and the variable valve 12 are controlled in such a manner as to achieve an appropriate intake air amount QA based on the result of Step S201, based on which the injector 7, the fuel pump 8, and the ignition coil 19 are controlled.

Next, in Step S203, it is determined whether or not to be in the EGR operating range. The determination is made based on FIG. 14. If it is not in the EGR operating range, then return to Step S202. If it is in the EGR operating range, then proceed to Step S204.

In Step S204, the target EGR flow rate TQE and the target recirculating gas temperature TTE are computed.

Next, in Step S205, the EGR valve 25, the cooling water pump 28, and the cooling water channel switching valve 29 are controlled to achieve the target EGR flow rate TQE and the target recirculating gas temperature TTE.

Next, in Step S206, the EGR flow rate QE is read in based on the relationship between the ion intensity II and the EGR flow rate QE, which is illustrated in FIG. 16B. The recirculating gas temperature TE is read in from a signal from the recirculating gas temperature detector 26a provided to the EGR cooler 26 which adjusts the temperature of the recirculating gas, the recirculating gas temperature detector 26a being an aspect of a recirculating gas temperature detector.

Next, in Step S207, it is determined whether or not the target EGR flow rate TQE is equal to the EGR flow rate QE, and whether or not the target recirculating gas temperature TTE is equal to the target recirculating gas temperature TE. If they are not equal, then return to Step S202. If they are determined to be equal, then proceed to Step S208.

In Step S208, the injection timing is computed based on FIG. 17A. Next, in Step S209, it is determined whether or not there is an advance request where the injection timing IT_SP (n−2) exceeds the injection timing advance limit IT_SPlimit. If the injection timing IT_SP (n−2) does not exceed the injection timing advance limit IT_SPlimit, then proceed to Step S210 to execute injection timing advance control. When the temperature of the exhaust gas to be recirculated by the recirculation device is high as opposed to when the temperature is low, or when the amount of the exhaust gas to be recirculated by the recirculation device is large as opposed to when the amount is small, the injection timing advance control is to control in such a manner as to advance the injection timing. If the injection timing IT_SP (n−2) exceeds the injection timing advance limit IT_SPlimit, then proceed to Step S211.

In Step S211, the ignition timing is computed based on FIG. 17B. Next, in Step S212, it is determined whether or not there is an advance request where an ignition timing ADV exceeds the ignition timing advance limit ADVlimit. If the ignition timing ADV does not exceed the ignition timing advance limit ADVlimit, then proceed to Step S213 to execute ignition timing advance control. When the temperature of the exhaust gas to be recirculated by the recirculation device is high as opposed to when the temperature is low, or when the amount of the exhaust gas to be recirculated by the recirculation device is large as opposed to when the amount is small, the ignition timing advance control is to control in such a manner as to advance the ignition timing. If the ignition timing ADV exceeds the ignition timing advance limit ADVlimit, then proceed to Step S214.

In Step S214, the charging time is computed based on FIG. 17C. Next, in Step S215, it is determined whether or not there is a charging request where a charging time DC exceeds the charging time limit DClimit. If the charging time DC does not exceed the charging time limit DClimit, then proceed to Step S216 to execute charging time extension control. When the temperature of the exhaust gas to be recirculated by the recirculation device is high as opposed to when the temperature is low, or when the amount of the exhaust gas to be recirculated by the recirculation device is large as opposed to when the amount is small, the charging time extension control is to control in such a manner as to extend the charging time. If the charging time DC exceeds the charging time limit DClimit, then proceed to Step S217.

In Step S217, the frequency of discharge is computed based on FIG. 18A. Next, in Step S218, it is determined whether or not there is a discharge request where a discharge frequency m exceeds the discharge frequency limit mlimit. If the discharge frequency m does not exceed the discharge frequency limit mlimit, then proceed to Step S219 to execute discharge frequency increase control. When the temperature of the exhaust gas to be recirculated by the recirculation device is high as opposed to when the temperature is low, or when the amount of the exhaust gas to be recirculated by the recirculation device is large as opposed to when the amount is small, the discharge frequency increase control is to control in such a manner as to increase the frequency of discharge. If the discharge frequency m exceeds the discharge frequency limit mlimit, then proceed to Step S220.

In Step S220, the tumble valve opening is computed based on FIG. 18B. Next, in Step S221, it is determined whether or not there is a valve closing request where a tumble valve opening TUMO exceeds the tumble valve opening limit TUMOlimit. If the valve closing request for the tumble valve opening TUMO does not exceed the tumble valve opening limit TUMOlimit, then proceed to Step S222 to execute tumble valve opening closing control.

When the temperature of the exhaust gas to be recirculated by the recirculation device is high as opposed to when the temperature is low, or when the amount of the exhaust gas to be recirculated by the recirculation device is large as opposed to when the amount is small, the tumble valve opening closing control is to control in such a manner as to reduce the tumble valve opening. The tumble valve opening is reduced to enhance the flow of an air-fuel mixture in the cylinder. If the valve closing request for the tumble valve opening TUMO exceeds the tumble valve opening limit TUMOlimit, then proceeds to Step S223 to prohibit EGR operation.

A swirl valve, instead of the tumble valve 6, may be provided to the intake pipe to be controlled in such a manner as to enhance the flow of the air-fuel mixture in the cylinder. The tumble valve 6 or the swirl valve forms a flow adjustment device.

Control where the compression pressure of the air-fuel mixture in the cylinder is reduced may be executed instead of the tumble valve opening closing control. Alternatively, both of the tumble valve opening closing control and the control where the compression pressure of the air-fuel mixture in the cylinder is reduced may be executed. The control where the compression pressure of the air-fuel mixture in the cylinder is reduced can be performed using a cylinder pressure adjustment device. The cylinder pressure adjustment device includes a valve mechanism (the variable valve 12) which operates the intake valve 12a or the exhaust valve 12b. Specifically, control where the timing to close the intake valve 12a is brought close to bottom dead center is performed, and accordingly the compression pressure of the air-fuel mixture in the cylinder is reduced. This operation is similar to that of control where the tumble valve 6 is closed to a low degree of opening.

The ECU 1 performs the above flow in predetermined cycles.

The above-mentioned injection timing advance control of Step S210 is control for extending the fuel spray distance (penetration). The ignition timing advance control of Step S213 is control for adjusting the ignition timing to ensure ignition. The charging time extension control of Step S216 is control which increases energy for ignition to increase ignitability. The discharge frequency increase control of Step S219 is control which increases the probability of ignition. The tumble valve opening closing control of Step S222 is control which enhances the flow of the air-fuel mixture in the cylinder to make flame propagation after ignition excellent.

In Step S210, as the control for extending the fuel spray distance (penetration), the above-mentioned (2) control which reduces the injection frequency n, (3) control which reduces the injection interval IT_RE, and (4) control which increases the fuel pressure FP may be executed instead of the injection timing advance control. If the injection frequency reduction control is executed, the injection frequency n is computed in Step S208. If the injection interval reduction control is executed, the injection interval IP_RES (n−2) is computed in Step S208. If the fuel pressure increase control is executed, the fuel pressure FP is computed in Step S208.

Moreover, a limit is set for each of (2) the injection frequency reduction control, (3) the injection interval reduction control, and (4) the fuel pressure increase control like the injection timing advance limit IT_SPlimit described in FIG. 17A. In other words, in FIG. 17A, in a case of the injection frequency reduction control, an injection frequency reduction limit nlimit substitutes for the injection timing advance limit IT_SPlimit, "increase of n" for "retard," "decrease of n" for "advance." In Step S209, it is determined whether or not n<nlimit. In FIG. 17A, in a case of the injection interval reduction control, an injection interval reduction limit IP_RESlimit substitutes for the injection timing advance limit IT_SPlimit, "increase of interval" for "retard," and "decrease of interval" for "advance." In Step S209, it is determined whether or not IP_RES (n−2)<IP_RESlimit. In FIG. 17A, in a case of the fuel pressure increase control, a fuel pressure increase limit FPlimit substitutes for the injection timing advance limit IT_SPlimit, "decrease of FP" for "retard," and "increase of FP" for "advance." In Step S209, it is determined whether or not FP>FPlimit is determined.

It is simply required in the part of Steps S208, S209, and S210 to execute at least one of the injection timing advance control, the injection frequency reduction control, the injection interval reduction control, and the fuel pressure increase control. Therefore, a plurality or all of the controls may be executed.

In the embodiment, the injection timing advance control, the injection frequency reduction control, the injection interval reduction control, or the fuel pressure increase control extends the penetration. Therefore, the fuel can be widely distributed in the combustion chamber. Moreover, the ignition timing, the charging time, or the frequency of discharge is controlled to ensure ignition. The tumble valve opening is controlled. Accordingly, flame propagation can be made excellent.

In the first and second embodiments, various controls are performed to extend the penetration. However, the amount of fuel to be injected is set to be the same between the case where the temperature of the exhaust gas to be recirculated by the recirculation device is high and the case where the temperature is low, or between the case where the amount of the exhaust gas to be recirculated by the recirculation device is large and the case where the amount is small. If fuel is injected once in one combustion cycle, the width of one injection pulse which drives the injector is set to be equal between the case where the temperature of the recirculating exhaust gas is high and the case where the temperature is low, or between the case where the amount of the recirculating exhaust gas is large and the case where the amount is small. In a case of divided multi-stage injection where fuel is injected at several times in one combustion cycle, the sum total of the widths of the several divided injection pulses which drive the injector is set to be equal between the case where the temperature of the recirculating exhaust gas is high and the case where the temperature is low, or between the case where the amount of the recirculating exhaust gas is large and the case where the amount is small. Moreover, in order to achieve this, the target fuel injection amount is set to the same target value between the case where the temperature of the exhaust gas to be recirculated by the recirculation device is high and the case where the temperature is low, or between the case where the amount of the exhaust gas to be recirculated by the recirculation device is large and the case where the amount is small.

The above embodiments according to the present invention include the following configuration: in other words, a control system of a gasoline engine including an injection device which injects fuel directly into a cylinder, and a recirculation device which recirculates exhaust gas to an intake side. When the temperature of the exhaust gas to be recirculated by the recirculation device is high as opposed to when the temperature is low, or when the amount of the exhaust gas to be recirculated by the recirculation device is large as opposed to when the amount is small, the control system executes at least one of advancing a fuel injection timing of the injection device, increasing the pressure of fuel to be supplied to the injection device, reducing the frequency of divided multi-stage injection of the injection device during a period from intake top dead center to compression top dead center, and reducing the interval of the divided multi-stage injection.

The recirculation device is an external EGR device including an exhaust gas recirculation pipe which couples an exhaust pipe and an intake pipe. The external EGR device includes a recirculating gas amount adjustment device which adjusts the amount of the exhaust gas to be recirculated. The external EGR device includes a recirculating gas temperature adjustment device which adjusts the temperature of the recirculating gas.

The recirculating gas amount adjustment device is a valve or throttle. The recirculating gas temperature adjustment device adjusts the temperature with cooling water or coolant which adjusts the temperature of the gasoline engine. Adjustments to the flow rate of the cooling water or coolant are made by a cooling water pump or cooling water channel switching valve or compressor provided to the gasoline engine.

A control system of a gasoline engine including an injection device which injects fuel directly into a cylinder, and a recirculation device which recirculates exhaust gas to an intake side includes an ignition device which discharges into an air-fuel mixture in the cylinder, and an ignition adjustment device which adjusts the charge amount or frequency of discharge of the ignition device. When the temperature of the exhaust gas to be recirculated by the recirculation device is high as opposed to when the temperature is low, or when the amount of the exhaust gas to be recirculated by the recirculation device is large as opposed to when the amount is small, the control system executes at least one of advancing the ignition timing of the ignition device, increasing the charge amount of the ignition adjustment device, and increasing the frequency of discharge of the ignition adjustment device.

A control system of a gasoline engine including an injection device which injects fuel directly into a cylinder, and a recirculation device which recirculates exhaust gas to an intake side includes a flow adjustment device which adjusts the flow of an air-fuel mixture in the cylinder and a cylinder pressure adjustment device which adjusts the compression pressure of the air-fuel mixture in the cylinder. When the temperature of the exhaust gas to be recirculated by the recirculation device is high as opposed to when the temperature is low, or when the amount of the exhaust gas to be recirculated by the recirculation device is large as opposed to when the amount is small, the control system executes at least one of control of enhancing the flow of the air-fuel mixture in the cylinder by the flow adjustment device, and control of reducing the compression pressure of the air-fuel mixture in the cylinder by the cylinder pressure adjustment device.

The flow adjustment device is a tumble valve or swirl valve provided to an intake pipe. The cylinder pressure adjustment device which adjusts the compression pressure of the air-fuel mixture in the cylinder can include a valve mechanism that operates an intake or exhaust valve.

In the embodiments according to the present invention, the penetration is extended to distribute the fuel widely in the combustion chamber. Accordingly, the mixing of fuel and air is promoted. As a result, it is possible to suppress the combustion fluctuation of the gasoline engine and achieve compatibility between improvement in efficiency and exhaust gas purification.

The present invention is not limited to the embodiments, and includes various modifications. For example, the embodiments are those described in detail to facilitate the understanding of the present invention, and is not necessarily limited to those including all the configurations. Moreover, part of the configuration of a given embodiment can be replaced with the configuration of another embodiment. Moreover, the configuration of a given embodiment can also be added to the configuration of another embodiment. Moreover, another configuration can be added to, removed from, and replaced with part of the configuration of each embodiment.

REFERENCE SIGNS LIST

1 ECU
2 accelerator opening sensor
3 air flow sensor
4 intake air temperature and moisture
5 throttle
6 tumble valve
7 injector
8 fuel pump
9 common rail
10 fuel pipe
11 intake pipe
12 variable intake/exhaust valve
13 piston
14 crankshaft
15 crank angle sensor
16 combustion chamber
17 cooling water temperature sensor
18 ignition plug
19 ignition coil
20 ion sensor (pressure sensor)
21 exhaust pipe
22 three-way catalytic converter
23 exhaust gas temperature sensor
24 air-fuel ratio sensor
25 EGR valve
26 EGR cooler
27 exhaust gas recirculation pipe
28 cooling water pump
29 cooling water channel switching valve
100 engine

The invention claimed is:

1. An engine control system for controlling an engine, the engine control system comprising:
an injection device which injects fuel directly into a cylinder; and
a recirculation device which recirculates exhaust gas to an intake side, wherein
when the temperature of the recirculating exhaust gas to be recirculated by the recirculation device is a first value as opposed to when the temperature is a second value that is lower than the first value, and when the amount of the recirculating exhaust gas to be recirculated by the recirculation device is a first value as opposed to when the amount is a second value that is smaller than the first value, the engine control system
advances a fuel injection timing of the injection device, and
reduces the frequency of divided multi-stage injection of the injection device during a period from intake top dead center and compression top dead center.

2. The engine control system according to claim 1, wherein in addition to the advancing a fuel injection timing and the reducing the frequency of divided multi-state injection, when the temperature of the recirculating exhaust gas to be recirculated by the recirculation device is the first value rather than the second value, or when the amount of the recirculating exhaust gas to be recirculated by the recirculation device is large as opposed to when the amount is small, the engine control system executes at least one of increasing the pressure of fuel to be supplied to the injection device and reducing the interval of the divided multi-stage injection.

3. The engine control system according to claim 2, wherein
the recirculation device is an external EGR device including an exhaust gas recirculation pipe which couples an exhaust pipe and an intake pipe, a recirculating gas amount adjustment device for adjusting the amount of the recirculating exhaust gas, and a recirculating gas temperature adjustment device for adjusting the temperature of the recirculating exhaust gas, and
the degree of opening of a valve forming the recirculating gas amount adjustment device is controlled to adjust the amount of the recirculating exhaust gas, a cooling water pump or cooling water channel switching valve forming the recirculating gas temperature adjustment device is controlled to adjust the flow rate of cooling water or coolant which adjusts the temperature of the engine, and accordingly the temperature of the recirculating exhaust gas is adjusted.

4. The engine control system according to claim 1, wherein
the engine is an engine including an ignition device which discharges into an air-fuel mixture in the cylinder, and an ignition adjustment device which adjusts the amount of charge or frequency of discharge of the ignition device, and
when the temperature of the recirculating exhaust gas is the first value rather than the second value, or when the amount of the recirculating exhaust gas is large as opposed to when the amount is small, the engine control system executes at least one of advancing an ignition timing of the ignition device, increasing the amount of charge of the ignition adjustment device, and increasing the frequency of discharge of the ignition adjustment device.

5. The engine control system according to claim 4, wherein the engine is an engine including a flow adjustment device which adjusts the flow of the air-fuel mixture in the cylinder, and a cylinder pressure adjustment device which adjusts compression pressure of the air-fuel mixture in the cylinder, and
when the temperature of the recirculating exhaust gas is the first value rather than the second value, or when the amount of the recirculating exhaust gas is large as opposed to when the amount is small, the engine control system executes at least one of control of enhancing the flow of the air-fuel mixture in the cylinder by the flow adjustment device, and control of reducing the compression pressure of the air-fuel mixture in the cylinder by the cylinder pressure adjustment device.

6. The engine control system according to claim 5, wherein
the flow adjustment device is a tumble valve or swirl valve provided to an intake pipe,
the cylinder pressure adjustment device is a valve mechanism which operates an intake valve or exhaust valve,
the tumble valve or swirl valve is controlled to perform the control of enhancing the flow of the air-fuel mixture in the cylinder, and
the valve mechanism is controlled to perform the control of reducing the compression pressure of the air-fuel mixture in the cylinder.

7. The engine control system according to claim 1, wherein
when the temperature of the exhaust gas to be recirculated by the recirculation device is the first value rather than the second value, or when the amount of the exhaust gas to be recirculated by the recirculation device is large as opposed to when the amount is small, the engine control system controls a spray distance of the fuel injected from the injection device in such a manner as to extend the spray distance.

8. The engine control system according to claim 7, wherein
when the temperature of the recirculating exhaust gas to be recirculated by the recirculation device is a first value that is higher than a second value, the engine control system controls a spray distance of the fuel injected from the injection device in such a manner as to extend the spray distance,
the engine control system computes a correction value of a target spray distance that is a target value of the spray distance,
the engine control system computes a target injection timing of the fuel injection timing and a target frequency of the divided multi-stage injection based on the correction value of the target spray distance, and
when the amount of the recirculating exhaust gas to be recirculated by the recirculation device is zero, the engine control system sets the correction value of the target spray distance to zero.

* * * * *